US007039392B2

(12) United States Patent
McCorkle et al.

(10) Patent No.: US 7,039,392 B2
(45) Date of Patent: May 2, 2006

(54) SYSTEM AND METHOD FOR PROVIDING DEVICE AUTHENTICATION IN A WIRELESS NETWORK

(75) Inventors: John W. McCorkle, Vienna, VA (US); Matthew L. Welborn, Vienna, VA (US); Richard D. Roberts, Vienna, VA (US)

(73) Assignee: Freescale Semiconductor, Austin, TX (US)

( * ) Notice: Subject to any disclaimer, the term of this patent is extended or adjusted under 35 U.S.C. 154(b) by 448 days.

(21) Appl. No.: 10/318,372

(22) Filed: Dec. 13, 2002

(65) Prior Publication Data

US 2004/0203600 A1    Oct. 14, 2004

Related U.S. Application Data

(63) Continuation-in-part of application No. 09/685,202, filed on Oct. 10, 2000.

(60) Provisional application No. 60/365,199, filed on Mar. 19, 2002, provisional application No. 60/339,371, filed on Dec. 13, 2001.

(51) Int. Cl.
*H04M 1/66* (2006.01)

(52) U.S. Cl. .................. 455/411; 455/410; 455/411; 455/404.2; 342/134

(58) Field of Classification Search ............. 455/411, 455/410, 404.2, 414.2, 440, 456.1, 456.3, 455/456.5, 456.6; 342/118, 134; 375/340
See application file for complete search history.

(56) References Cited

U.S. PATENT DOCUMENTS

| | | | | | |
|---|---|---|---|---|---|
| 5,987,316 | A | * | 11/1999 | Gordon et al. | ............... 455/411 |
| 6,026,125 | A | * | 2/2000 | Larrick et al. | ............... 375/295 |
| 6,239,736 | B1 | * | 5/2001 | McDonald et al. | ........... 342/28 |
| 6,239,741 | B1 | * | 5/2001 | Fontana et al. | ............. 342/135 |
| 6,300,903 | B1 | * | 10/2001 | Richards et al. | ............ 342/450 |
| 6,483,461 | B1 | * | 11/2002 | Matheney et al. | .......... 342/463 |
| 6,594,762 | B1 | * | 7/2003 | Doub et al. | .................. 455/517 |
| 2002/0128039 | A1 | * | 9/2002 | Finn | ........................... 455/556 |
| 2003/0036374 | A1 | * | 2/2003 | English et al. | .............. 455/403 |

* cited by examiner

*Primary Examiner*—Joseph Feild
*Assistant Examiner*—Huy D. Nguyen
(74) *Attorney, Agent, or Firm*—Posz Law Group, PLC

(57) ABSTRACT

A system and method are provided for authenticating a new device in a wireless network using an authentication device. First, the new device estimates the distance between the new device and the authenticating device as a first distance measurement, and sends the first distance measurement to the authentication device. The authentication device then estimates the distance between the new device and the authenticating device as a second distance measurement. The authentication device then evaluates the first and second distance measurements to determine if they meet authentication criteria and sends authentication data to the new device only if the first and second distance measurements meet the authentication criteria. These criteria can be that they do not differ by more than a set error value or that they both are below a set maximum value.

15 Claims, 16 Drawing Sheets

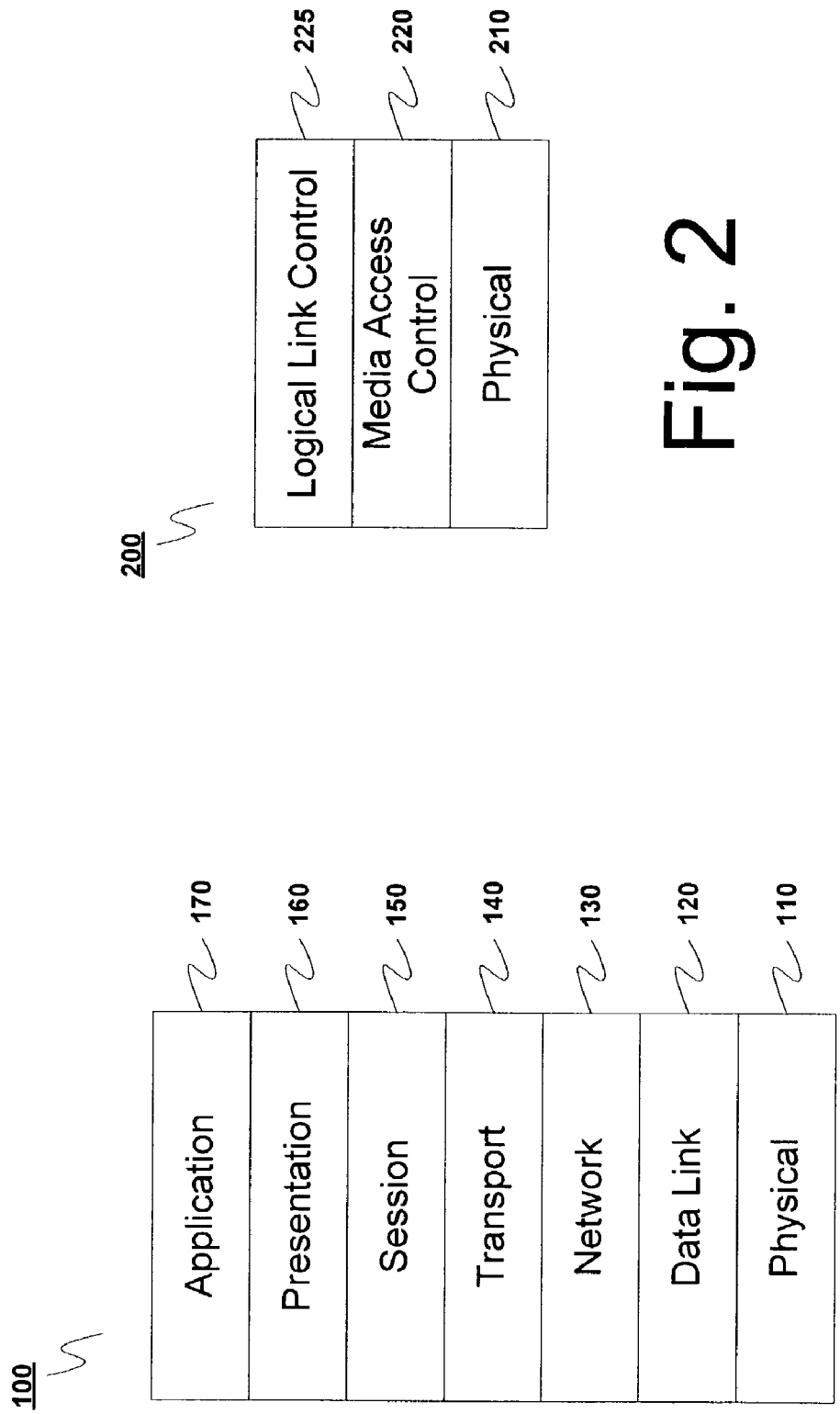

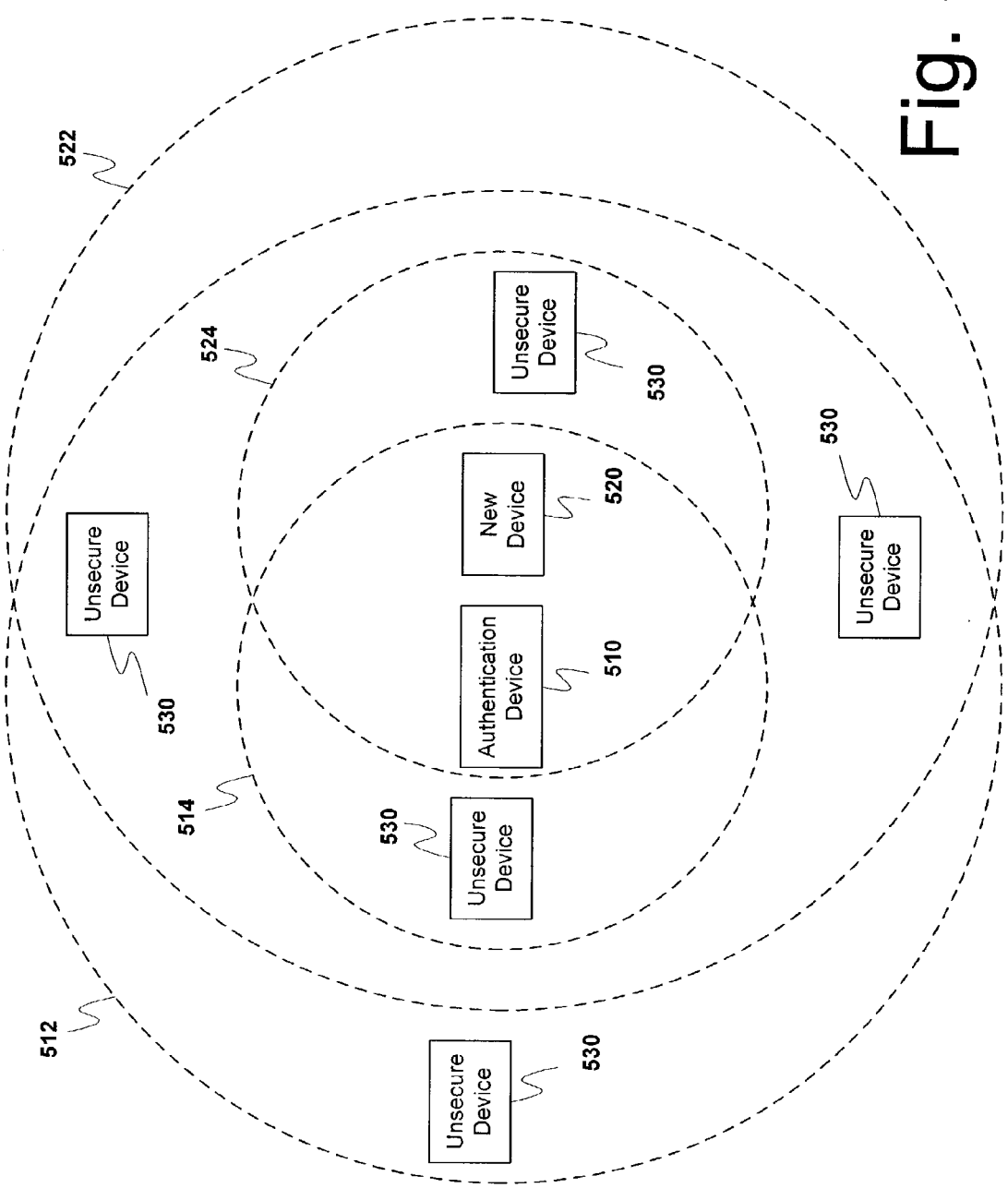

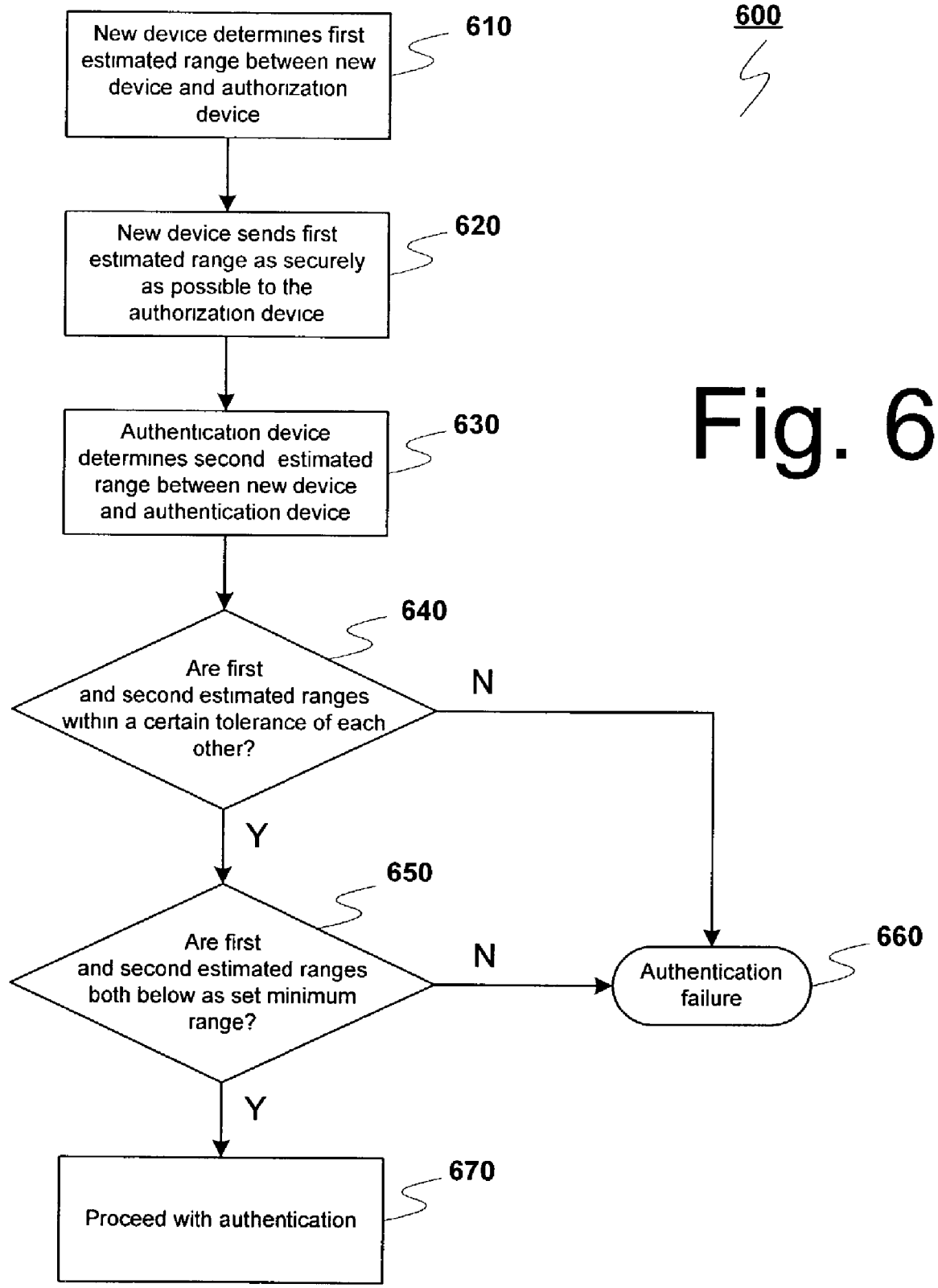

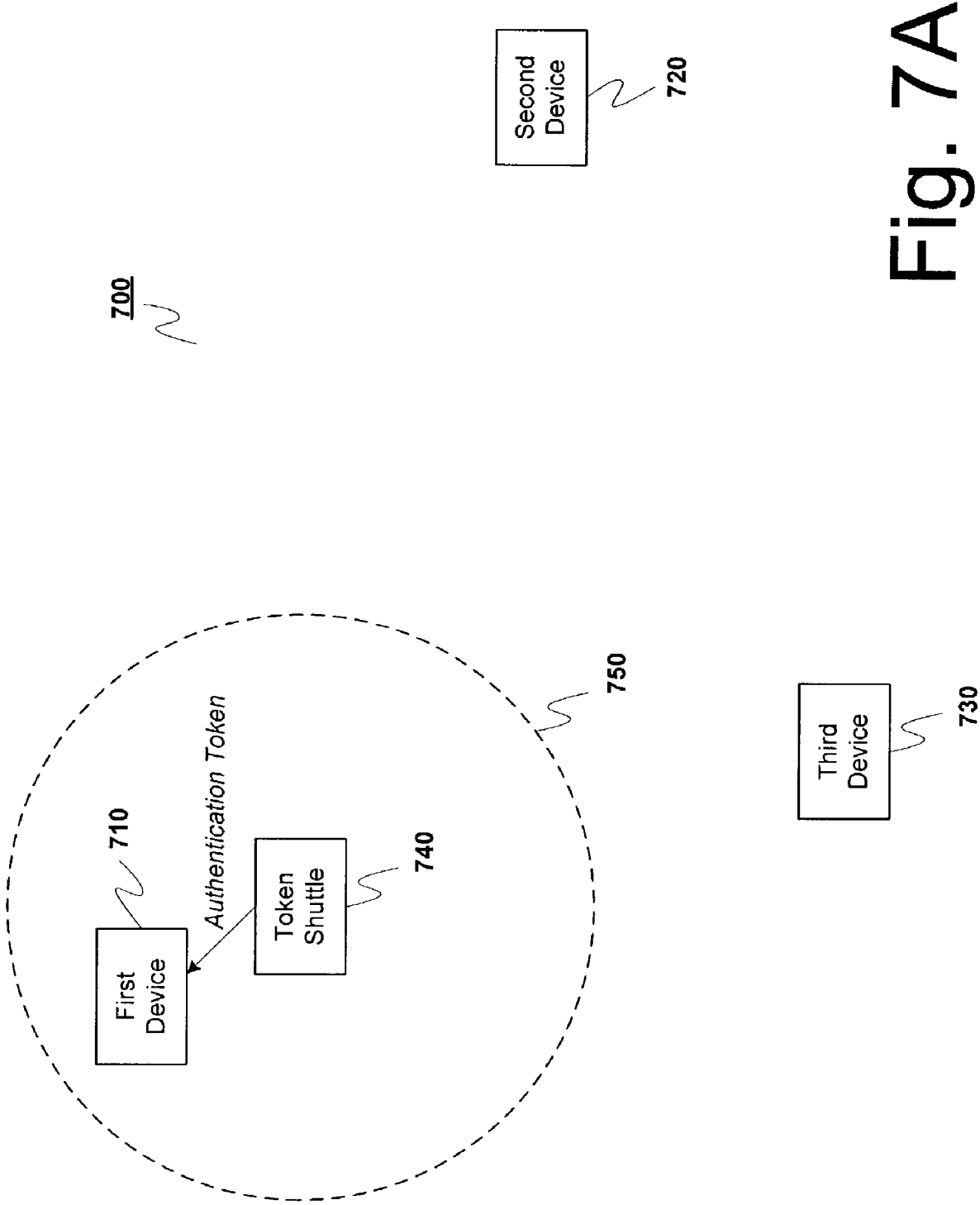

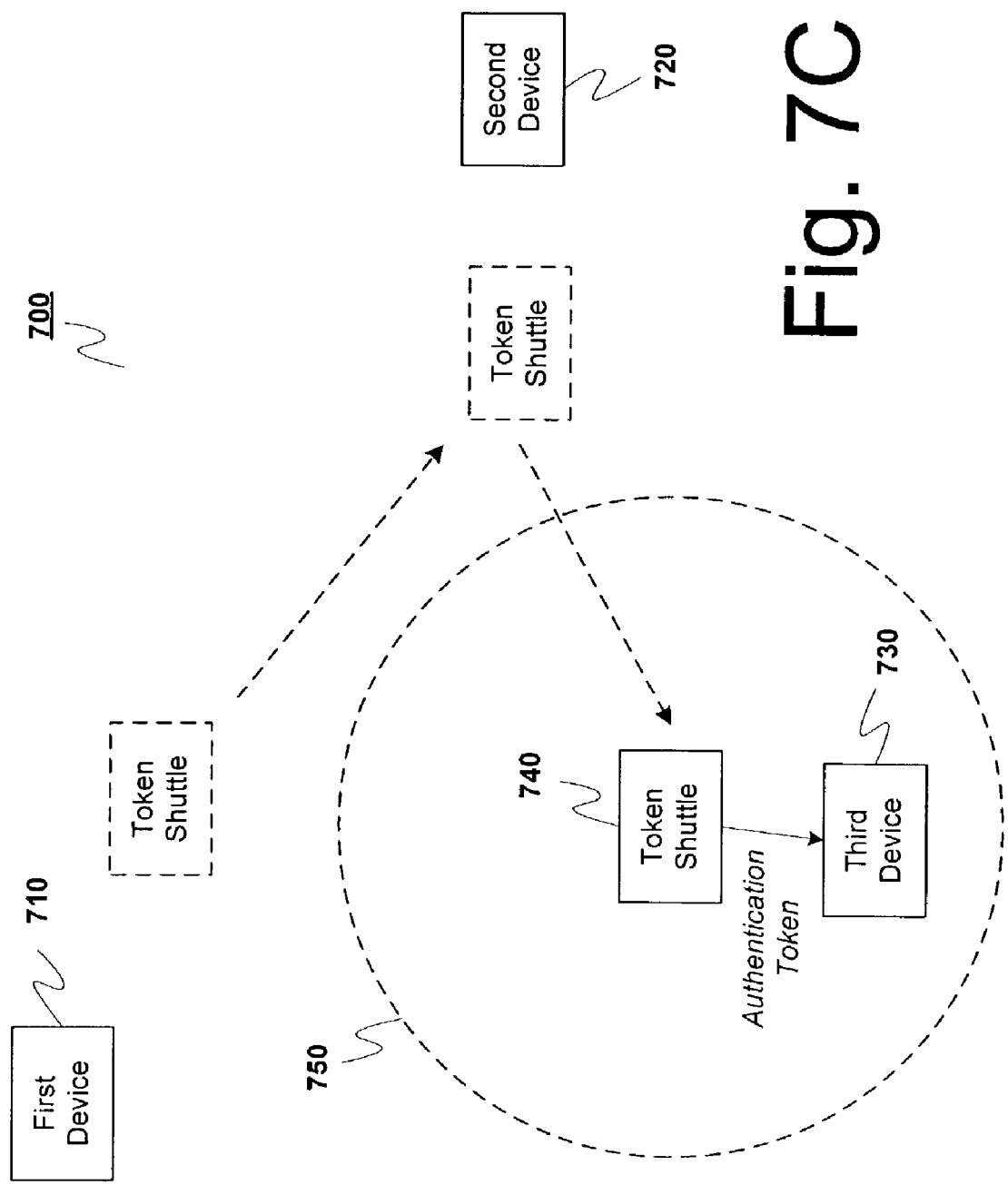

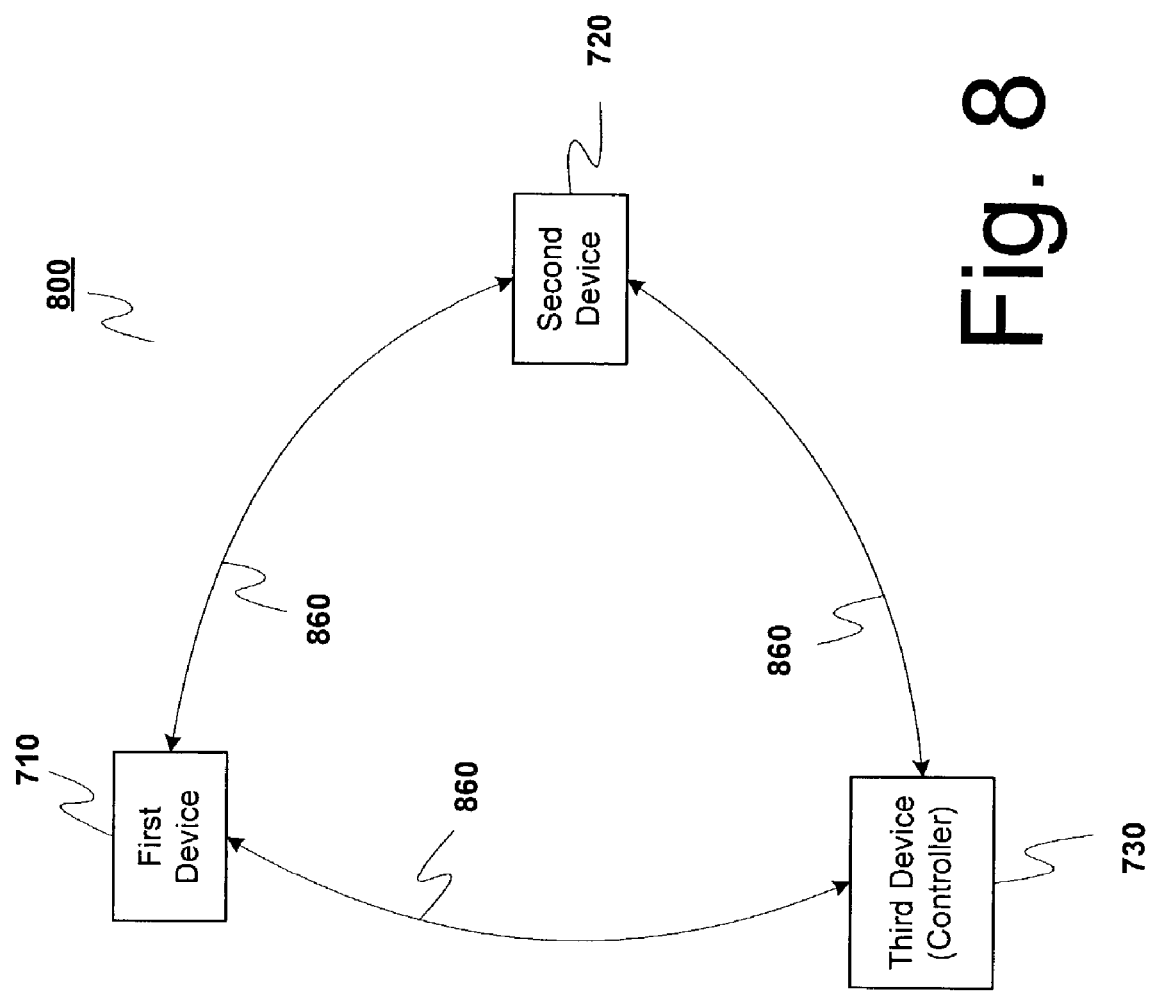

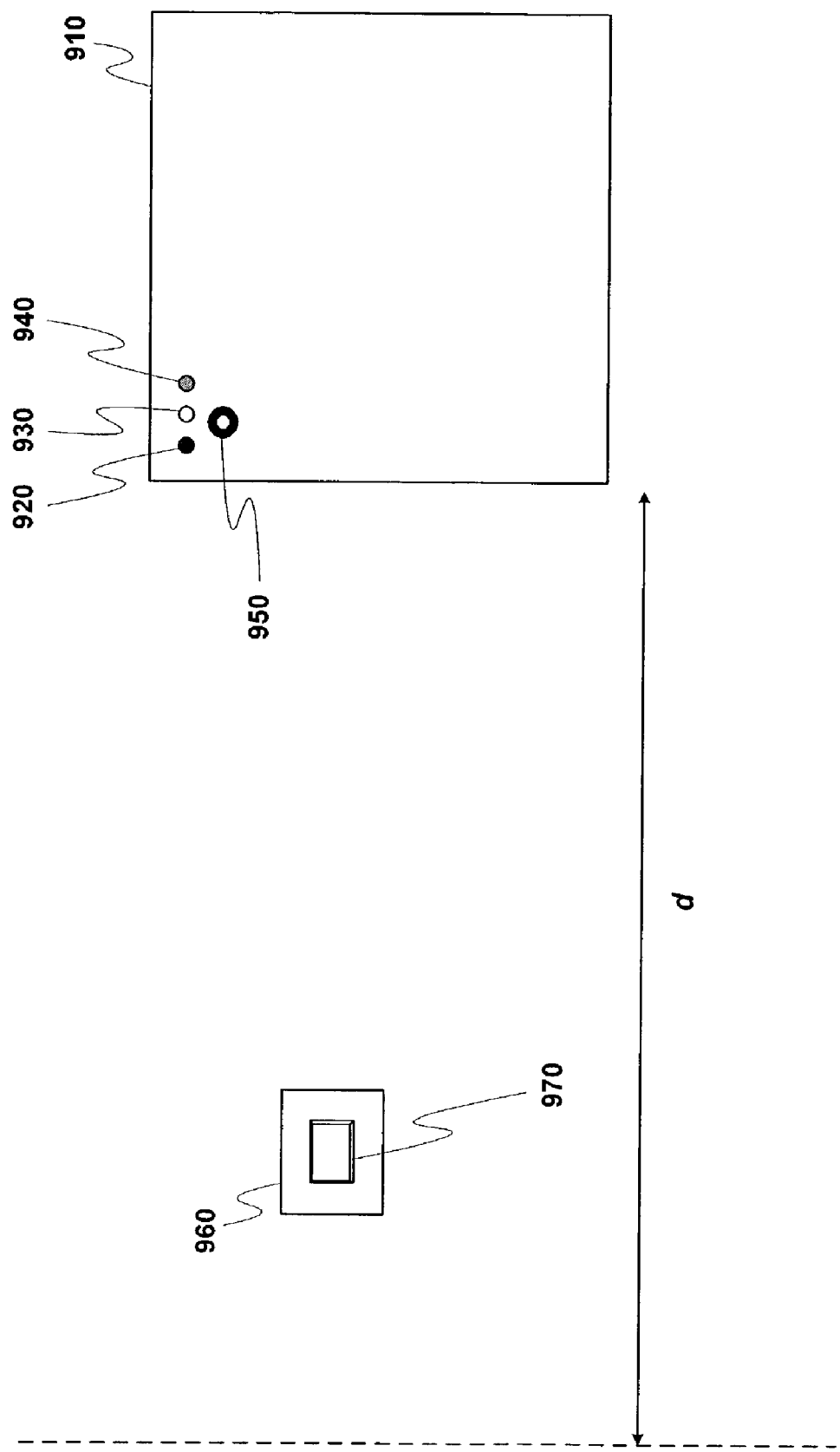

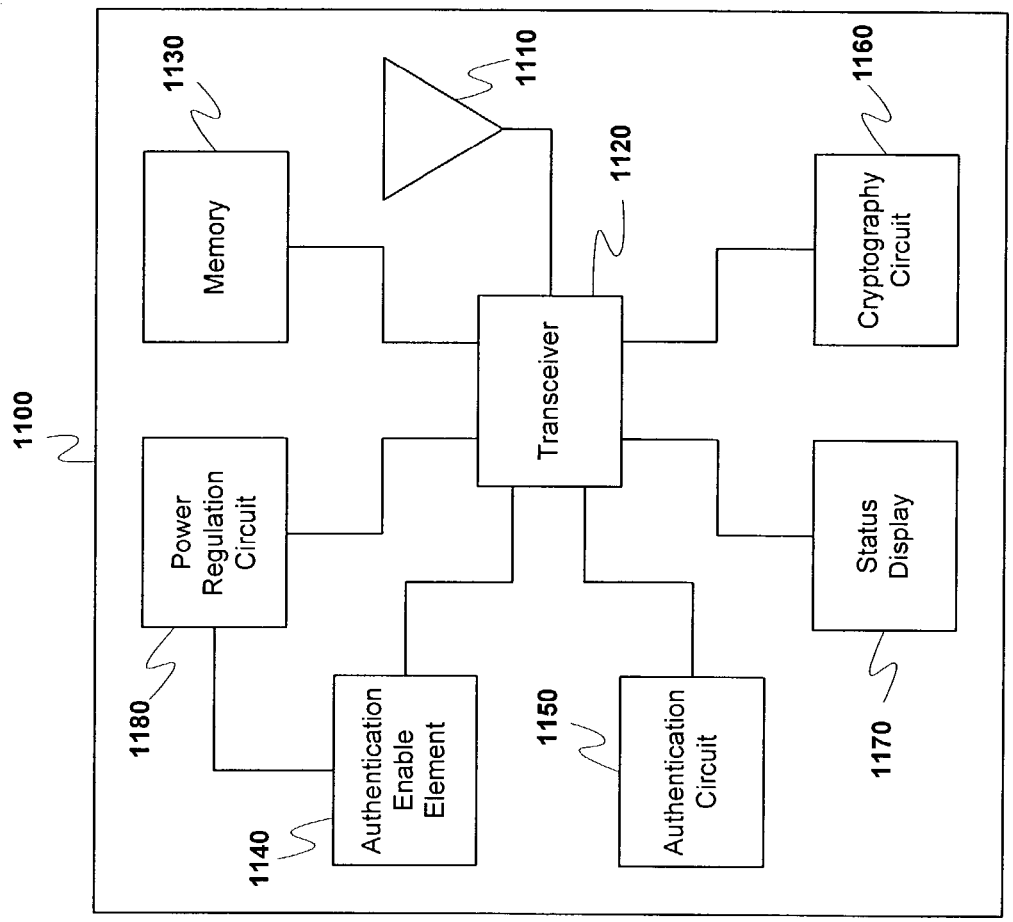

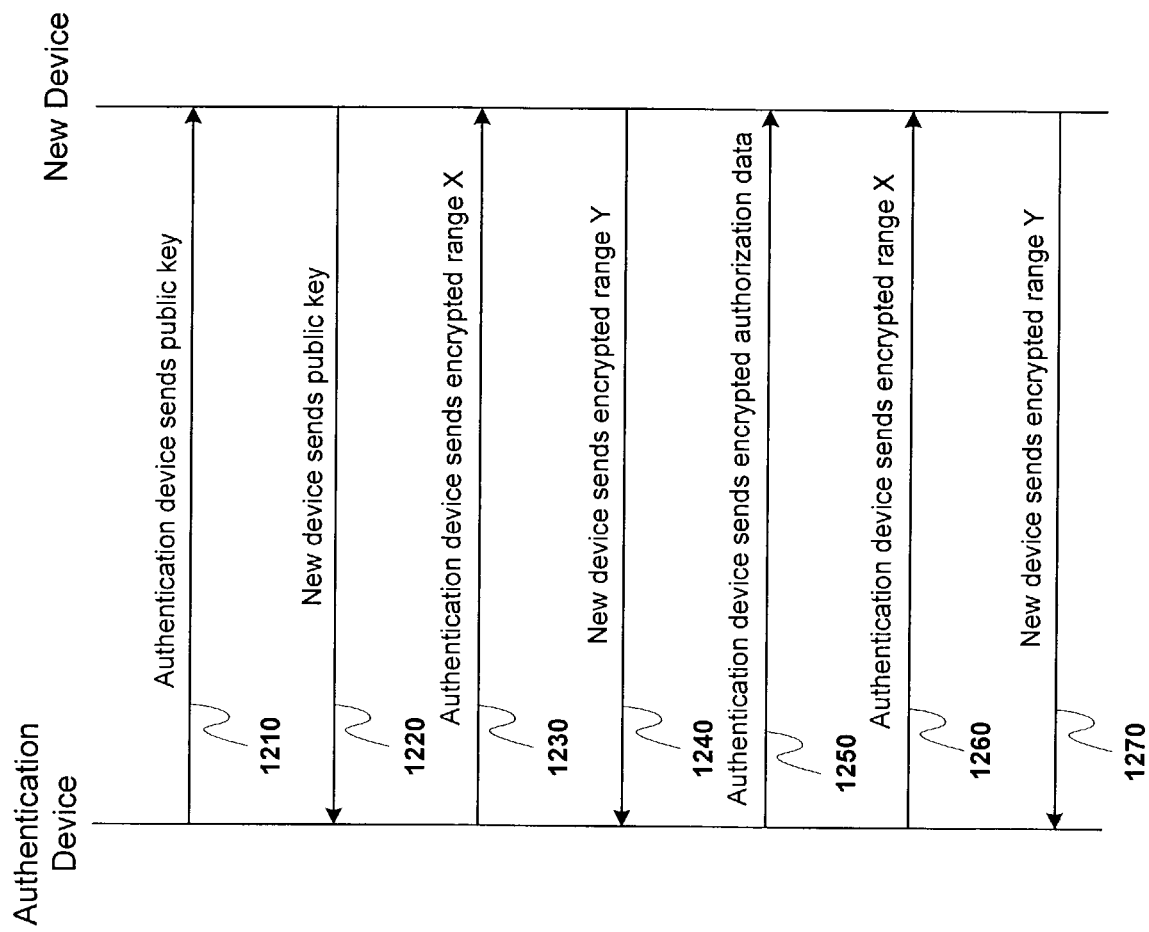

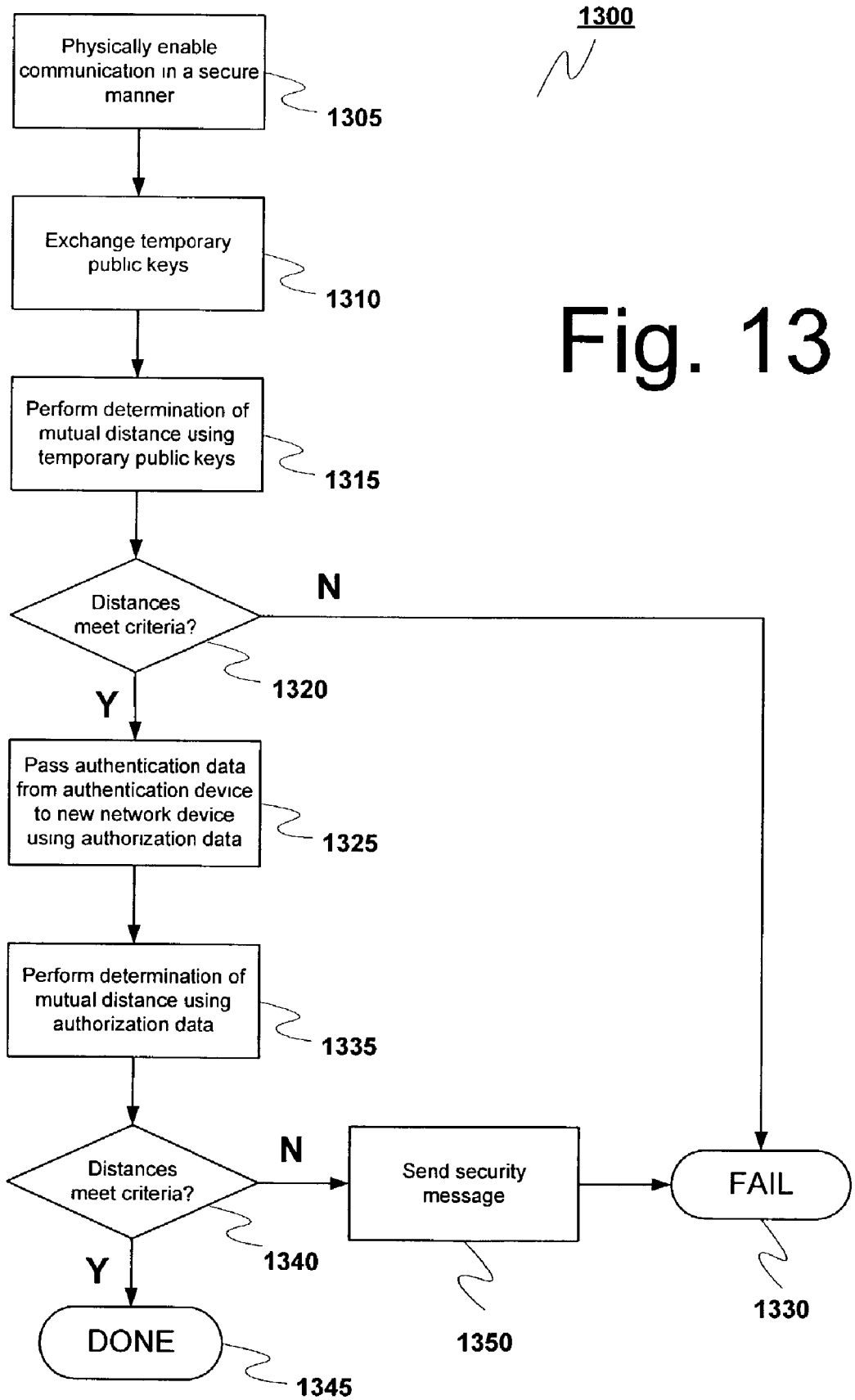

SYSTEM AND METHOD FOR PROVIDING DEVICE AUTHENTICATION IN A WIRELESS NETWORK

CROSS-REFERENCE TO RELATED PATENT DOCUMENTS

This application is a continuation-in-part of U.S. patent application Ser. No. 09/685,202, by Martin Rofheart et al., for "METHOD AND SYSTEM FOR ENABLING DEVICE FUNCTIONS BASED ON DISTANCE INFORMATION," filed Oct. 10, 2000, which is hereby incorporated by reference in its entirety. This application relies for priority on U.S. provisional patent application Ser. No. 60/365,199, by Richard D. Roberts, for "METHOD AND APPARATUS FOR RANGE-BASED AUTHENTICATION AND AUTHORIZATION," filed Mar. 19, 2002, and U.S. provisional patent application Ser. No. 60/339,371, by Matthew L. Welborn, for "PHY LAYER COOPERATION IN SECURITY CERTIFICATION," filed Dec. 13, 2001, which are both hereby incorporated by reference in their entirety.

BACKGROUND OF THE INVENTION

The present invention relates to wireless personal area networks and wireless local area networks. More particularly, the present invention relates to systems, methods, devices, and computer program products for increasing security and providing secure authentication of devices in a wireless personal area network or wireless local area network environment.

The International Standards Organization's (ISO) Open Systems Interconnection (OSI) standard provides a seven-layered hierarchy between an end user and a physical device through which different systems can communicate. Each layer is responsible for different tasks, and the OSI standard specifies the interaction between layers, as well as between devices complying with the standard.

FIG. 1 shows the hierarchy of the seven-layered OSI standard. As seen in FIG. 1, the OSI standard 100 includes a physical layer 110, a data link layer 120, a network layer 130, a transport layer 140, a session layer 150, a presentation layer 160, and an application layer 170.

The physical (PHY) layer 110 conveys the bit stream through the network at the electrical, mechanical, functional, and procedural level. It provides the hardware means of sending and receiving data on a carrier. The data link layer 120 describes the representation of bits on the physical medium and the format of messages on the medium, sending blocks of data (such as frames) with proper synchronization. The networking layer 130 handles the routing and forwarding of the data to proper destinations, maintaining and terminating connections. The transport layer 140 manages the end-to-end control and error checking to ensure complete data transfer. The session layer 150 sets up, coordinates, and terminates conversations, exchanges, and dialogs between the applications at each end. The presentation layer 160 converts incoming and outgoing data from one presentation format to another. The application layer 170 is where communication partners are identified, quality of service is identified, user authentication and privacy are considered, and any constraints on data syntax are identified.

The IEEE 802 Committee has developed a three-layer architecture for local networks that roughly corresponds to the physical layer 110 and the data link layer 120 of the OSI standard 100. FIG. 2 shows the IEEE 802 standard 200.

As shown in FIG. 2, the IEEE 802 standard 200 includes a physical (PHY) layer 210, a media access control (MAC) layer 220, and a logical link control (LLC) layer 225. The PHY layer 210 operates essentially as the PHY layer 110 in the OSI standard 100. The MAC and LLC layers 220 and 225 share the functions of the data link layer 120 in the OSI standard 100. The LLC layer 225 places data into frames that can be communicated at the PHY layer 210; and the MAC layer 220 manages communication over the data link, sending data frames and receiving acknowledgement (ACK) frames. Together the MAC and LLC layers 220 and 225 are responsible for error checking as well as retransmission of frames that are not received and acknowledged.

FIG. 3 is a block diagram of a wireless network 300 that could use the IEEE 802 standard 200. In a preferred embodiment the network 300 is a wireless personal area network (WPAN), or piconet. However, it should be understood that the present invention also applies to other settings where bandwidth is to be shared among several users, such as, for example, wireless local area networks (WLAN), or any other appropriate wireless network.

When the term piconet is used, it refers to a network of devices connected in an ad hoc fashion, having one device act as a coordinator (i.e., it functions as a server) while the other devices (sometimes called stations) follow the time allocation instructions of the coordinator (i.e., they function as clients). The coordinator can be a designated device, or simply one of the devices chosen to function as a coordinator. One primary difference between the coordinator and non-coordinator devices is that the coordinator must be able to communicate with all of the devices in the network, while the various non-coordinator devices need not be able to communicate with all of the other non-coordinator devices.

As shown in FIG. 3, the network 300 includes a coordinator 310 and a plurality of devices 321–325. The coordinator 310 serves to control the operation of the network 300. As noted above, the system of coordinator 310 and devices 321–325 may be called a piconet, in which case the coordinator 310 may be referred to as a piconet coordinator (PNC). Each of the non-coordinator devices 321–325 must be connected to the coordinator 310 via primary wireless links 330, and may also be connected to one or more other non-coordinator devices 321–325 via secondary wireless links 340, also called peer-to-peer links.

In addition, although FIG. 3 shows bi-directional links between devices, they could also be unidirectional. In this case, each bidirectional link 330, 340 could be shown as two unidirectional links, the first going in one direction and the second going in the opposite direction.

In some embodiments the coordinator 310 may be the same sort of device as any of the non-coordinator devices 321–325, except with the additional functionality for coordinating the system, and the requirement that it communicate with every device 321–325 in the network 300. In other embodiments the coordinator 310 may be a separate designated control unit that does not function as one of the devices 321–325.

Through the course if the following disclosure the coordinator 310 will be considered to be a device just like the non-coordinator devices 321–325. However, alternate embodiments could use a dedicated coordinator 310. Furthermore, individual non-coordinator devices 321–325 could include the functional elements of a coordinator 310, but not use them, functioning as non-coordinator devices. This could be the case where any device is a potential coordinator 310, but only one actually serves that function in a given network.

Each device of the network 300 may be a different wireless device, for example, a digital still camera, a digital video camera, a personal data assistant (PDA), a digital music player, or other personal wireless device.

The various non-coordinator devices 321–325 are confined to a usable physical area 350, which is set based on the extent to which the coordinator 310 can successfully communicate with each of the non-coordinator devices 321–325. Any non-coordinator device 321–325 that is able to communicate with the coordinator 310 (and vice versa) is within the usable area 350 of the network 300. As noted, however, it is not necessary for every non-coordinator device 321–325 in the network 300 to communicate with every other non-coordinator device 321–325.

FIG. 4 is a block diagram of a device 310, 321–325 from the network 300 of FIG. 3. As shown in FIG. 4, each device (i.e., each coordinator 310 or non-coordinator device 321–325) includes a physical (PHY) layer 410, a media access control (MAC) layer 420, a set of upper layers 430, and a management entity 440.

The PHY layer 410 communicates with the rest of the network 300 via a primary or secondary wireless link 330 or 340. It generates and receives data in a transmittable data format and converts it to and from a format usable through the MAC layer 420. The MAC layer 420 serves as an interface between the data formats required by the PHY layer 410 and those required by the upper layers 430. The upper layers 205 include the functionality of the device 310, 321–325. These upper layers 430 may include TCP/IP, TCP, UDP, RTP, IP, LLC, or the like.

Typically, the coordinator 310 and the non-coordinator devices 321–325 in a WPAN share the same bandwidth. Accordingly, the coordinator 310 coordinates the sharing of that bandwidth. Standards have been developed to establish protocols for sharing bandwidth in a wireless personal area network (WPAN) setting. For example, the IEEE standard 802.15.3 provides a specification for the PHY layer 410 and the MAC layer 420 in such a setting where bandwidth is shared using time division multiple access (TDMA). Using this standard, the MAC layer 420 defines frames and superframes through which the sharing of the bandwidth by the devices 310, 321–325 is managed by the coordinator 310 and/or the non-coordinator devices 321–325.

Of particular interest is how individual devices 321–325 are authenticated when they wish to join an existing network 300. This is always a concern with wireless networks, and is particularly of concern with WPANs.

Security in a WLAN with respect to device authentication is not generally too difficult to achieve. A WLAN by definition has access to a wired infrastructure. This wired infrastructure can generally be used to contact a remote site that can be used for verification. Such a remote site could be a database maintained by the network, the Internet, etc. In the case of a remote database, a network could access stored information that can authenticate the new device. In the case of the Internet the network could contact a third party site that provides authentication services. Such trusted third parties sites can ensure identities and provide security certifications for new devices that wish to join a network.

However, this is not necessarily the case with WPANs. A WPAN may or may not have access to a wired infrastructure. If not, some other way must be provided to authenticate new devices and ensure that authenticated devices may be allowed into a network.

Regardless of how it is done, authentication relies upon a trusted third party for authentication. Whether by digital signature or otherwise, the trusted third party makes certain that the new device is indeed what it says it is, and may properly be allowed to join a network.

Using digital signatures, for example, each device has means by which it can send a digital signature. If a first device wants to authenticate the identity of a second device, the first device asks for the second device's digital signature. The second device passes this digital signature to the first device, which takes that digital signature to a trusted third party, e.g., a trusted third party site on the Internet. The trusted third party then tells the first device who that signature belongs to, verifying the second device's identity from a known and trusted source. The second device can also do this to verify the identity of the first device.

This works well if the network has access to a remote trusted third part, as could be accomplished by being connected to the Internet. AWPAN may not have that luxury. Therefore, it would be desirable to provide a secure method of authenticating a device in a wireless network.

Preferred embodiments of the present invention will be described below. And while the embodiments described herein will be in the context of a WPAN (or piconet), it should be understood that the present invention also applies to other settings where bandwidth is to be shared among several users, such as, for example, wireless local area networks (WLAN), or any other appropriate wireless network.

SUMMARY OF THE INVENTION

Consistent with the title of this section, only a brief description of selected features of the present invention is now presented. A more complete description of the present invention is the subject of this entire document.

An object of the present invention is to provide a secure method and system of authenticating devices joining a wireless network.

Another object of the present invention is to use multiple security measures for device authentication in a wireless network.

Another feature of the present invention is to use range measurements between devices during device authentication in a wireless network.

These and other objects are accomplished by way of a method for an authentication device to authenticate a new device in an ultrawide bandwidth (UWB) wireless network. This method comprises: reducing a transmission power of the authentication device to an authentication transmission power level, where an authentication transmission range associated with the authentication power level is lower than a normal transmission range associated with a normal transmission power level used for normal operation in the UWB wireless network; determining a first distance measurement at the authentication device using ultrawide bandwidth ranging, the first distance measurement providing a measurement of the distance between the new device and an authentication device, as made by the authentication device; evaluating the first distance measurement to determine if it meets authentication criteria; and sending authentication data to the new device only if the first distance measurement meets the authentication criteria.

The authentication evaluation criteria may include that the first distance measurement is below a set maximum value.

In one preferred embodiment the authentication transmission power level provides the UWB wireless network with an effective range between 0.3 and 2 meters. In one preferred embodiment, the normal transmission power level provides the UWB wireless network with an effective range between 5 and 25 meters. In another preferred embodiment, the authentication transmission power level provides the UWB wireless network with an effective range between 0.5 and 1 meter. In one preferred embodiment the authentication transmission power level is between 15 and 25 dB below the normal transmission power level.

The method may further comprise receiving a second distance measurement from the new device, the second distance measurement providing a measurement of the distance between the new device and an authentication device, as made by the new device; and evaluating the first and second distance measurement to determine if they meet the authentication criteria. In this case, the step of sending authentication data to the new device is performed only if the first and second distance measurements meet the authentication criteria.

The evaluation criteria may include that the first and second distance measurements are both below a set minimum value or that the first and second distance measurements are within a set variance from each other. The step of evaluating the first and second measurements is performed by comparing the first measurement with the second measurement to determine a variance between the first and second measurements. The comparing may be performed by taking the absolute value of the difference between the first and second measurements.

The method may further comprise: sending a temporary public key of a temporary public/private encryption key pair to the new device prior to the step of receiving the second distance measurement. The first distance measurement may then be encrypted by the new device using the temporary public key, and is decrypted by the authentication device using a temporary private key of the temporary public/private encryption key pair.

The method may further comprise the following steps performed after the sending step: receiving a third distance measurement from the new device, the third distance measurement providing a measurement of the distance between the new device and the authentication device, as made by the new device; determining a fourth distance measurement at the authentication device, the fourth distance measurement providing a measurement of the distance between the new device and the authentication device made by the authentication device; evaluating the first and second distance measurements to determine if they meet the authentication criteria; and indicating a security failure if the third and fourth distance measurements do not meet the authentication criteria.

The authentication data includes an authentication public/private encryption key pair. The third distance measurement may be encrypted by the new device using the authentication public key of the authentication public/private encryption key pair, and may be decrypted by the authentication device using an authentication private key of the authentication public/private encryption key pair.

BRIEF DESCRIPTION OF THE DRAWINGS

A more complete appreciation of the invention and its many attendant advantages will be readily obtained as it becomes better understood with reference to the following detailed description when considered in connection with the accompanying drawings, in which:

FIG. 1 is a block diagram of the OSI standard for a computer communication architecture;

FIG. 2 is a block diagram of the IEEE 802 standard for a computer communication architecture;

FIGS. 5A–5C are block diagrams showing the transmission ranges of various wireless network devices according to preferred embodiments of the present invention;

FIG. 6 is a flow chart of a method of using range information to enhance security in a device authentication process, according to a preferred embodiment of the present invention;

FIGS. 7A–7C are diagrams showing the operation of a token shuttle for authentication according to a preferred embodiment of the present invention;

FIG. 8 is a diagram of a network formed by the authentication processes shown in FIGS. 7A–7C;

FIG. 9 is a diagram showing the authentication of an new network device according to a preferred embodiment of the present invention;

FIG. 11 shows an alternate embodiment of a new network device according to a preferred embodiment of the present invention;

FIG. 12 is a data flow diagram showing the passage of data between an authentication device and a new network device according to a preferred embodiment of the present invention; and FIG. 13 is a flow chart showing the operation of the authentication process according to a preferred embodiment of the present invention.

DETAILED DESCRIPTION OF THE PREFERRED EMBODIMENTS

Figure 3:
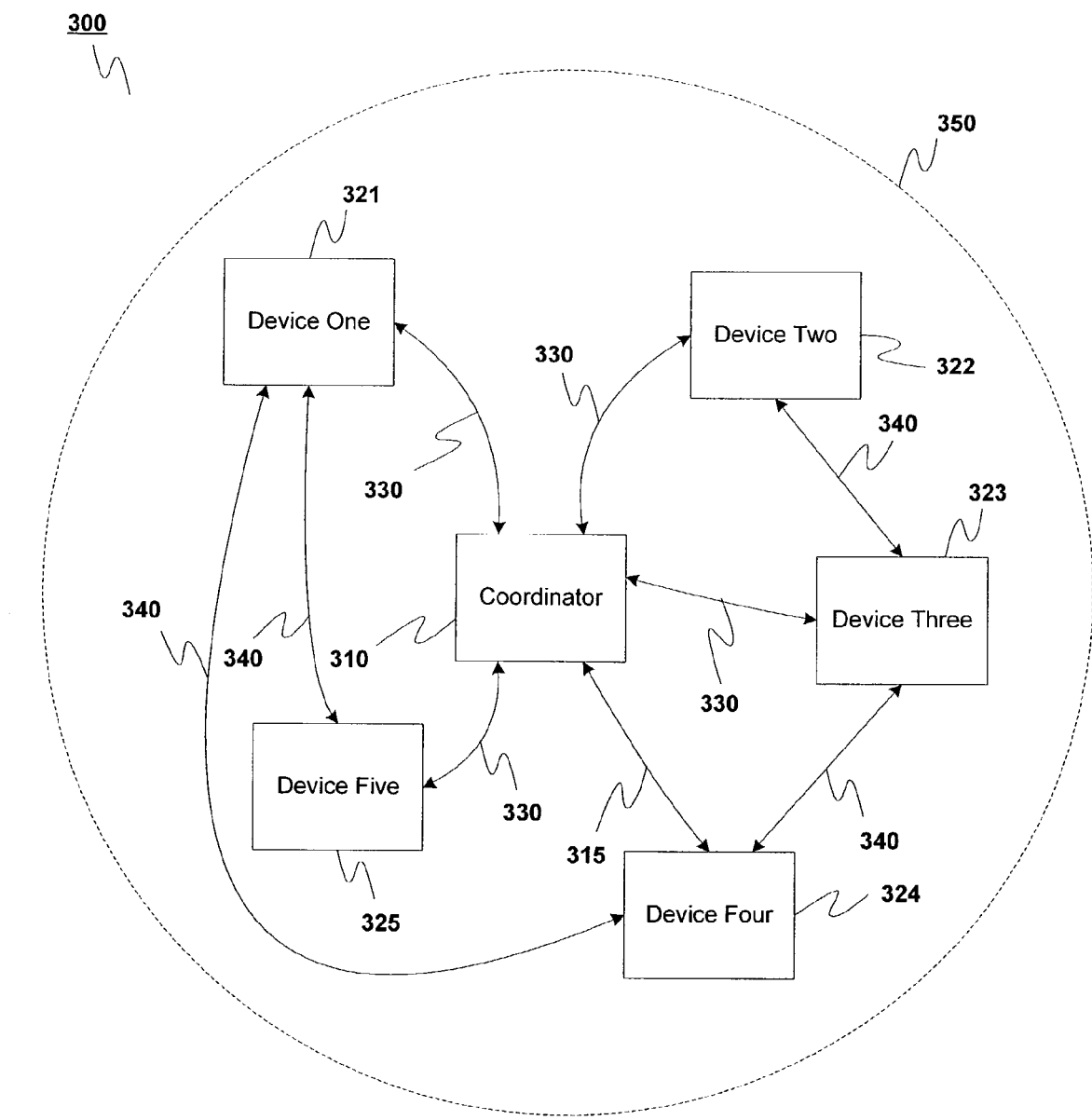
FIG. 3 is a block diagram of a wireless network.
Figure 4:
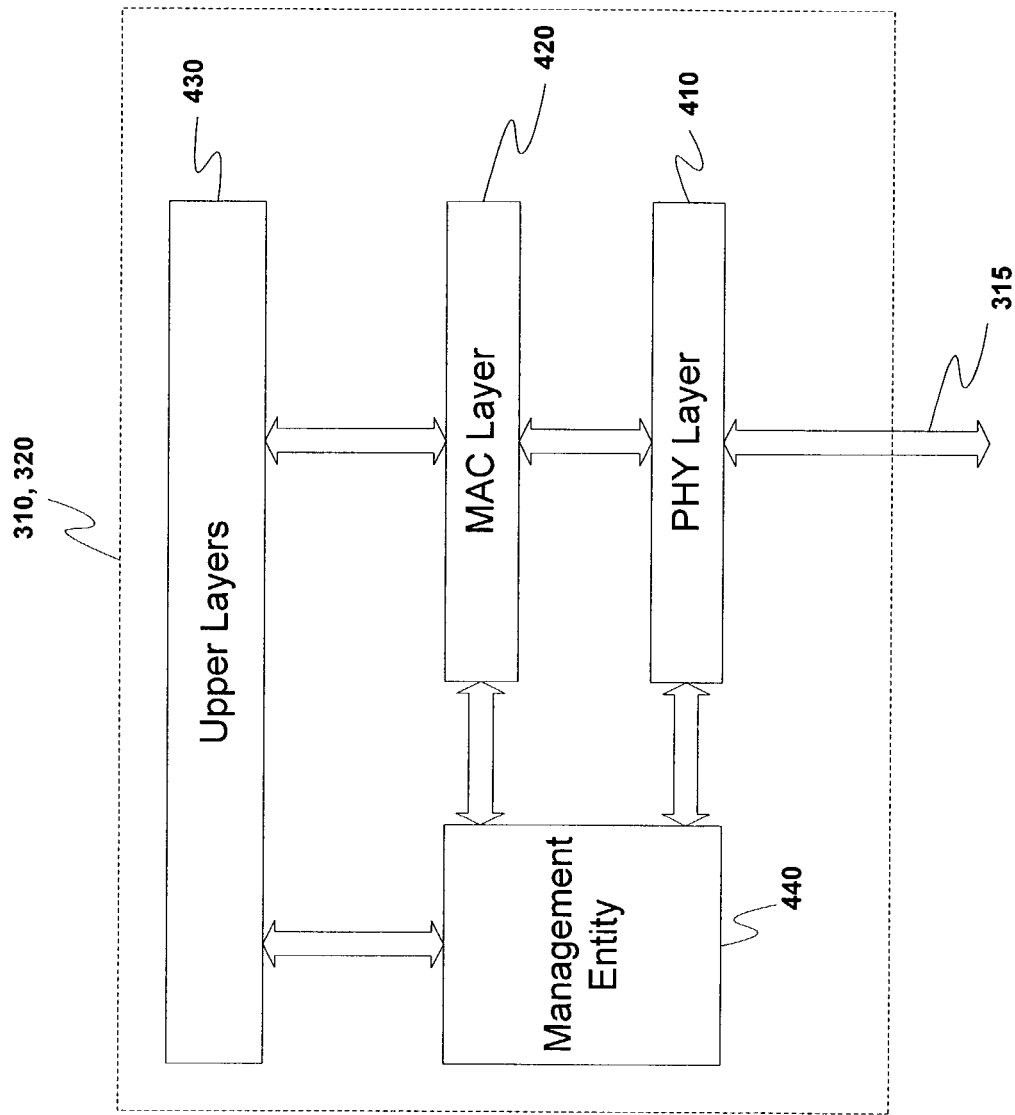
FIG. 4 is a block diagram of a device or coordinator in the wireless network of FIG. 3.

Preferred embodiments of the present invention will now be described with reference to the drawings. Throughout the several views, like reference numerals designate identical or corresponding parts.

Low Transmission Power "Secure" Mode

One way to maintain security in wireless devices is to take advantage of the portability of wireless devices by requiring that a new device that wishes to be authenticated so that it can enter a network be physically close to an authenticating device. This can be accomplished by reducing the transmit power of either the new device or the authenticating device, e.g., by about 20 dB, so that their effective range is reduced to a small fraction of their normal range.

If this is done, then when authentication information, e.g., security keys, are sent between an authentication device and a new device, generally only receivers within that limited range will be able to hear the authentication signal. And the network administrator should be able to more easily monitor what devices are within that limited transmission range.

In various embodiments of the present invention, the portability of the authentication device and the new device may vary. However, for the purposes of the preferred embodiments described below, one or both should be sufficiently portable such that the two devices can be brought to within close proximity.

If the devices that make up the network are large or otherwise awkward to move, e.g., video screens, speakers, DVD players, etc., then the authentication device will preferably be small enough to carry around to the proximity of these devices. If, however, the devices that make up the network are small and easily moved, e.g. hand-held video cameras, personal digital assistants, etc., then the authentication device could be large or immobile and each new device brought close to the authentication device when it joins the network. Of course it is also possible that both the authentication device and the network devices are small and portable, allowing either to be brought within range of the other.

An analogy for this kind of security measure is the creation of a club. Consider the example of forming a club with restricted membership. A club founder starts by sending out a notice telling people that if they want to join the club they should come to a particular meeting place at a particular date and time. At the appointed hour, everybody who wants to join the club physically comes to the room and is handed a membership entry token by the club founder. This membership token can then be shown to other members as proof of membership.

The club founder could let anyone who showed up join the club by giving out membership tokens freely to all who arrive, or he could limit membership by some criteria, giving membership tokens to only those people who fulfilled some specific criteria.

Regardless, membership is established by being physically accessible by a trusted party, in this case the club founder. Prior to being authenticated, i.e., given a membership token, each potential club member is in the physical presence of the club founder, i.e., a trusted third party who evaluates him for membership. If the potential member is deemed suitable for membership (by whatever criteria are desired), he will be authenticated as a suitable member and given a membership token.

In this example, the membership criteria are simply being at the membership meeting, though the criteria could be more rigorous. Regardless, it is a necessary condition that each potential member be in physical proximity to the club founder at some point to receive a membership token.

In a wireless network example, the potential new member is a new network device, the trusted third party is an authentication device, and the membership token is some sort of authentication data, e.g., an encryption key pair. However, the general process of authentication is the same.

Figure 5A:
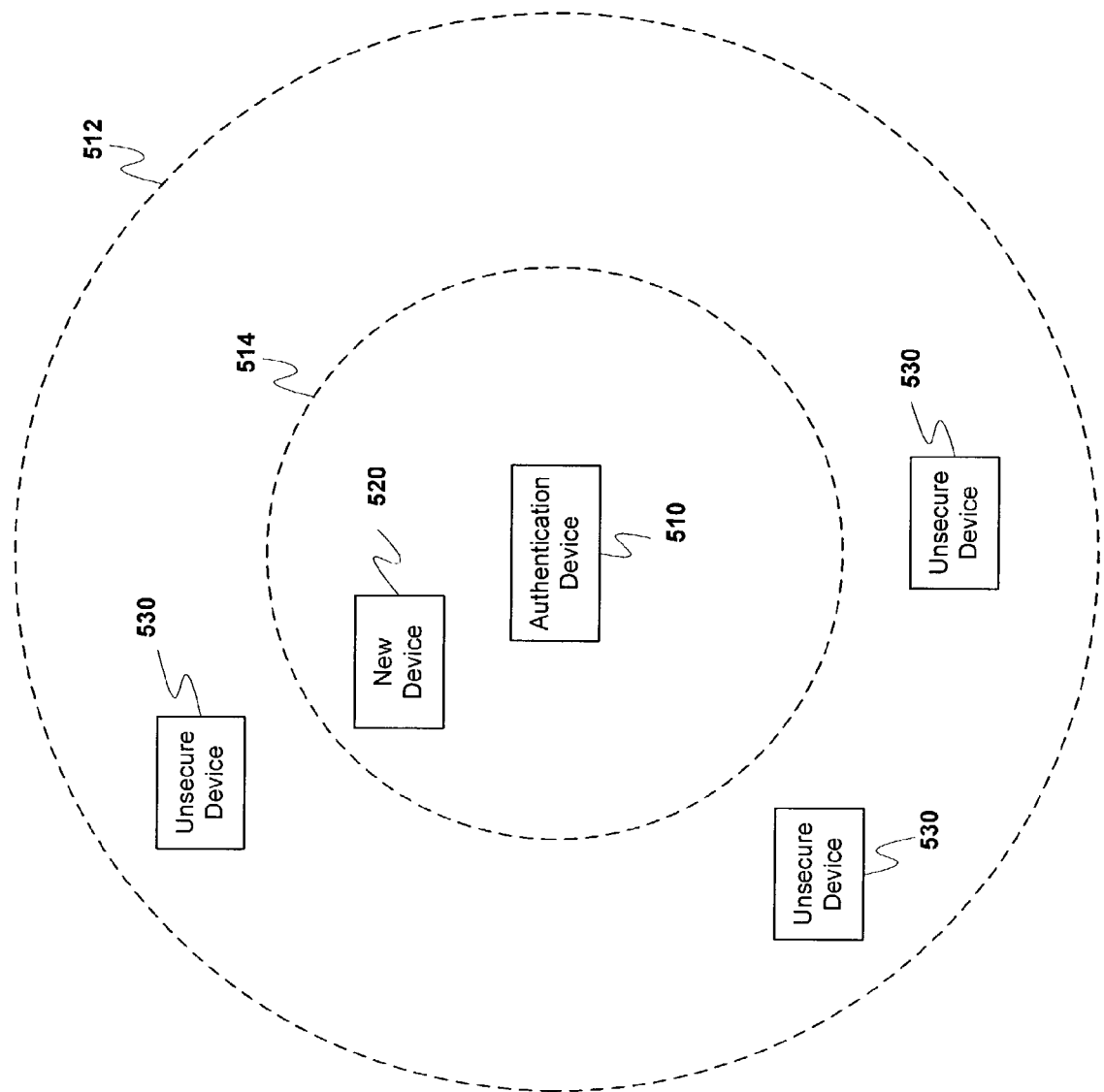
Figure 5B:
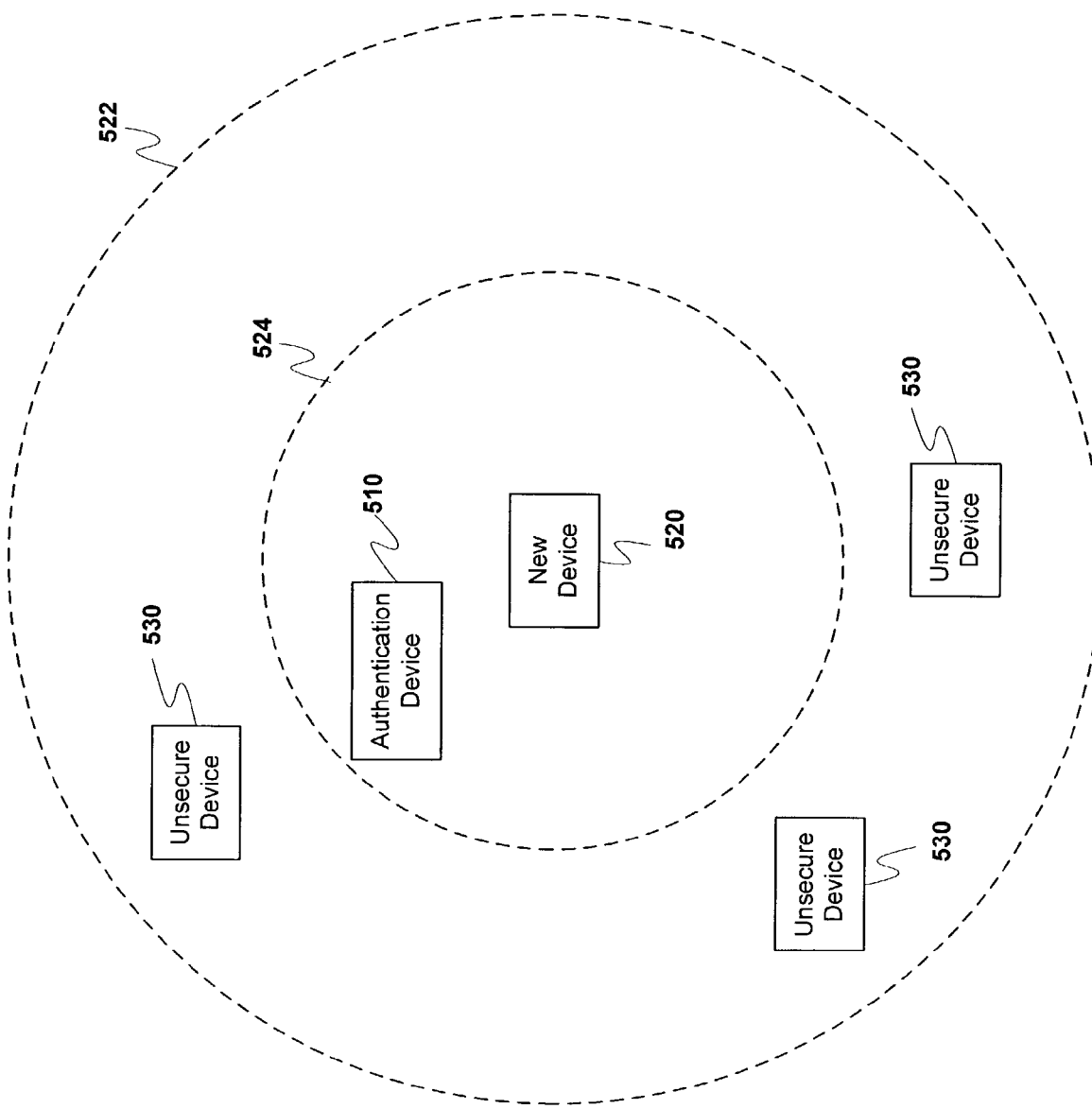

FIGS. 5A–5C are block diagrams showing the transmission ranges of various wireless network devices according to preferred embodiments of the present invention. FIG. 5A illustrates a preferred embodiment in which the transmission range of an authentication device is varied for an authentication process; FIG. 5B illustrates a preferred embodiment in which the transmission range of a new network device is varied for an authentication process; and FIG. 5C shows illustrates a preferred embodiment in which the transmission ranges of both an authentication device and a new network device are varied for an authentication process.

As shown in FIG. 5A, an authentication device 510 and a new network device 520 need to communicate to authenticate the new network device 510. Under normal operation, the authentication device 510 has a normal effective transmission range 512 based on its normal transmission power and a normal level of antenna sensitivity. However one or more unsecured devices 530 (i.e., devices that have not been authenticated by the authentication device 510) may be within the normal range 512.

Therefore, for authentication, the authentication device 510 enters into an authentication mode (also called a secure mode or a whisper mode), lowering its transmission power and transmitting only within a secure authentication transmission range 514 (again assuming a normal level of antenna sensitivity). The network user, knowing the authentication range 514 (also called the secure range), can make certain that the new network device 520 is within the authentication range 514 and can communicate with the authentication device 520 to receive any necessary authentication information, e.g., security keys.

However any unsecured devices 530 outside of the authentication range 514 will be unable to intercept the authentication information sent by the authentication device 510. And since the authentication range 514 is preferably chosen to be very small, e.g., one or two feet, or perhaps a meter, it will be very easy for a network user to physically police the authentication range 514 for unauthorized users 530.

As shown in FIG. 5B, an authentication device 510 and a new network device 520 need to communicate to authenticate the new network device 510. Under normal operation, the new device 520 has a normal effective transmission range 522 based on its normal transmission power and a normal level of antenna sensitivity. However one or more unsecured devices 530 (i.e., devices that have not been authenticated by the authentication device 520) may be within the normal range 522.

Therefore, for authentication, the new device 510 enters into an authentication mode (also called a secure mode or a whisper mode), lowering its transmission strength and transmitting only within a secure authentication transmission range 524 (again assuming a normal level of antenna sensitivity). At this point, if the unsecured devices 530 are outside of the authentication range 524 (also called a secure range), they will be unable to intercept any information sent from the new network device 520 to the authentication device 510.

While this will not prevent an unauthorized device 530 from intercepting data sent from the authenticating device 510, it can be used to enhance security. In one embodiment encryption data, e.g., an RSA public encryption key, can be sent from the new device 520 to the authentication device 510. This encryption data is then used to encrypt the transmission of the authentication data. Since the authorization data is sent in an encrypted manner, the unsecured devices 530 cannot decipher it, and so cannot intercept the authentication data.

As shown in FIG. 5C, an authentication device 510 and a new network device 520 need to communicate to authenticate the new network device 510. Under normal operation, the authentication device 510 has a normal effective transmission range 512 and the new network device 520 has a normal effective transmission range 522, based on their normal transmission power and a normal level of antenna sensitivity. However one or more unsecured devices 530 (i.e., devices that have not been authenticated by the authentication device 510) may be within one or both of the normal ranges 512 and 522.

Therefore, for authentication, both the authentication device 510 and the new device 520 enter into an authentication mode (also called a secure mode or a whisper mode), lowering their transmission strength and transmitting only within a secure authentication transmission range 514, 524 (again assuming a normal level of antenna sensitivity). The network user, knowing the authentication ranges 514, 524 (Also called secure ranges) can make certain that the new network device 520 is within the authentication range 514 of the authentication device 510, and that the authentication device 510 is within the authentication range 524 of the new network device 520. Thus, the authentication device 510 and the new device 520 can communicate and exchange any necessary authentication information, e.g., security keys.

However any unsecured devices 530 outside of the authentication range 514 of the authentication device 510 will be unable to intercept the authentication information sent by the authentication device 510. Likewise, any unsecured devices 530 outside of the authentication range 524 of the new device 520 will be unable to intercept any authentication information sent by the new device 520. And since these authentication ranges 514, 524 are preferably chosen to be very small, e.g., one or two feet, or perhaps a meter, it will be very easy for a network user to physically police the authentication ranges 514, 524 for unauthorized users 530.

For the normal transmission range 512, 522, each device 510, 520 operates at a normal transmission power level. For the authentication transmission range 514, 524, each device 510, 520 operates at an authentication transmission power level. The difference between these power levels will depend upon the variance between the normal transmission range 512, 522 and the authentication transmission range 514, 524.

Generally, a drop of 6 dB in power will halve the effective range of a transmission. Thus, how many decibels lower in power the authentication power level must be as compared to the normal transmission power level is entirely dependent upon how much lower the authentication range 514, 524 is than the normal range 512, 514.

For example, if the normal transmission range were 40 meters, a drop of 12 dB would make the authentication range equal to about 10 meters, i.e., two drops of 6 dB halves the effective range twice, reducing it to one quarter of its original value. Likewise, if the normal transmission range were 8 meters and the authentication range were 1 meter, the authentication transmission power level would have to be 18 dB lower than the normal transmission power level (i.e., $\frac{1}{8}^{th}$ of the normal transmission power level, which requires the normal transmission power level to be halved three times.) Although the examples above all use multiples of 6 dB, alternate values can be used. The examples use multiples of 6 dB to aid in the simplicity of explanation.

Often the normal range 512, 514 will be chosen for reasons not relating to security. However, by varying the authentication transmission power, the system can achieve the required authentication rage 514, 524.

In alternate embodiments the authentication device 510 may have only a single output power setting. If the authentication device 510 is a dedicated device that serves no other function but to authenticate new network devices 520, then it may be designed to only operate in a secure mode with a very low transmission power. In this case, the authentication device 510 will only have a single effective transmission, range, i.e., the secure range 514.

Using Ranging Data for Enhanced Security

In addition to using a low transmission power secure mode for authentication, enhanced security can also be achieved by using ranging data to assist with authentication. In one preferred embodiment this can be accomplished by having both a new network device and an authentication device determine ranging data between each other.

Range information can be determined by additional circuitry in the physical layer 210 of a device using the IEEE 802.15 standard 200. An example of how this can be accomplished is shown in U.S. patent application Ser. No. 09/685,202, by Martin Rofheart et al., for "METHOD AND SYSTEM FOR ENABLING DEVICE FUNCTIONS BASED ON DISTANCE INFORMATION," filed Oct. 10, 2002, which has been incorporated by reference. This example is also disclosed in International (PCT) application publication no. WO 01/93434 A2, by XtremeSpectrum, Inc., for "METHOD AND SYSTEM FOR ENABLING DEVICE FUNCTIONS BASED ON DISTANCE INFORMATION," filed May 25, 2001, which is hereby incorporated by reference in its entirety.

During authentication, the new network device determines a range between itself and the authentication device. The new device then sends this ranging information to the authenticating device in as secure a means as possible. At the same time, the authentication device makes a separate determination of the distance between the two devices and sends that ranging data to the new device in as secure a manner as possible.

These two sets of ranging data can then be used to authenticate the new device. For example, the authentication device can compare the two ranges. If they do not agree within a certain tolerance, then the authentication fails. This would make it difficult for unsecured devices outside of a minimum secure range, i.e., the range of a device in a low transmission power secure mode, to spoof the authentication device into believing it were a particular new network device. The unsecured device would have to guess at the exact range of the new device it was trying to take the place of.

In addition, the authentication device can consider the two estimated ranges and determine whether they are below a minimum range. If either number is outside of the minimum secure range, then the authentication will fail. Thus, any device outside of the secure range cannot be authenticated. And since the secure range is small, a user can more easily police that area for unauthorized devices.

In alternate embodiments only a single device, preferably the authorization device, can evaluate the range data. In this case, the valuating device should be a secure and trusted device.

FIG. 6 is a flow chart of a method of using range information to enhance security in a device authentication process, according to a preferred embodiment of the present invention.

As shown in FIG. 6, in this process 600, a new network device determines a first estimated range between the new device and an authentication device (Step 610), and then sends the first estimated range as securely as possible, e.g., encrypted using RSA encryption, to the authentication device. (Step 620) The authentication device in turn determines a second estimated range between the new device and the authentication device. (Step 630)

The authentication device then compares the first and second estimates to determine if they are within a set tolerance of each other. (Step 640) The authentication device also determines whether the first and second estimated ranges are below a set minimum secure range. (Step 650)

If both conditions are met, i.e., the two range estimates are within a tolerance of each other and are both below the minimum secure range, the authentication device will proceed with the next step of authentication. If, however, even one of these conditions is not met, the authentication will fail.

Although the flow chart of FIG. 6 shows the new device making the first range estimate (Step 610) prior to the authentication device making the second range estimate (Step 620), these steps need not be performed in that order. Also, although the flow chart of FIG. 6 shows the authentication device comparing the two range estimates to each other (Step 640) prior to the authentication device comparing the two estimated ranges to the minimum secure range (Step 650), these steps need not be performed in that order.

In the preferred embodiment, the minimum secure range is on the order of a foot or two, and the tolerance is on the order of tenths of feet. However, alternate embodiments can choose different values depending upon device operation and accuracy, and the range over which physical security can easily be maintained.

Alternate embodiments could limit themselves to only one of these range comparisons. For example the authentication device could only check to see whether the two range estimates were within a set tolerance of each other. Alternatively, the authentication device could check only to see that the range between the authentication device and the new network device was below the minimum secure range. This last embodiment would be useful in the case where only the authentication device had range estimation capability.

For some alternate applications, it may be desirable to enforce a requirement that the authenticating device and the new device have no intervening obstructions between them, i.e., be in the same room, for authentication in addition to or in place of the requirement of a fixed range threshold. Using this approach, the authentication device can specifically exclude access to unsecure devices that are transmitting from outside the room, around a corner, behind a bookcase, or otherwise out of direct line of sight.

To accomplish this test, the authentication device analyzes the transmission of a device requesting authentication. During the message exchange required by the authentication process, the authenticating device computes an estimate of the multipath characteristics of the signal transmitted by the new device. Based on this estimate, the authenticating device determines whether the signal likely was received in direct line of sight from the transmitter, or whether there was likely some obstruction, e.g., a wall, that the signal encountered prior to reception.

This can enhance security because no devices can be authenticated that are out of line of sight of the authenticating device, and by extension out of line of sight of the network operator. The network operator can more easily police the authentication area if authentication requires that a device be within line of sight.

Controlling Authentication Period to Enhance Security

A further option for enhancing security is to have a network user physically enable an authentication mode that would last for an authentication period of limited duration. New devices would only be authorized to join the network during this limited-duration authentication period.

Thus, unauthenticated devices would not be able to join a network at any time that was not during this limited duration authentication period. Outside of such a period, i.e., when an authentication device was not in authentication mode, the network would not allow new devices to be authenticated. And since authentication will generally be an uncommon occurrence, but one whose timing is well known, network users can often afford to exercise a heightened level of security during authentication.

Use of Encryption to Enhance Security

Preferred embodiments of the present invention may also use encryption to provide a greater level of security for authentication. One preferred method if encryption is the use of dual key encryption, e.g., RSA encryption using a public/private key pair.

RSA encryption uses a pair of keys, a public key and a private key to send secure messages. The private key is not revealed to anyone, but is kept secret by a first entity. The public key is given to a second entity for use in encryption and authentication. Once the second entity has a verified public key, it can encrypt messages to the first entity by using the public key. These encrypted messages can only be decrypted by someone with the first entity's private key.

In addition, if the first entity encrypts a message using the private key, this message can only be decrypted using the first entity's public key. Thus, if the second entity receives a message that it can decrypt using the first entity's public key, it knows that the device was sent by the first entity and was not tampered with. This is also known as providing the message with a digital signature.

The RSA algorithm was invented in 1978 by Ron Rivest, Adi Shamir, and Leonard Adleman. The following is a brief description of the math behind RSA public key encryption.

First, choose P and Q such that P and Q are two large (e.g., 1024-bit) prime numbers.

Then choose E such that E is less than PQ, and such that E and (P−1)(Q−1) are relatively prime, which means they have no prime factors in common. E does not have to be prime, but it must be odd. (P−1)(Q−1) can't be prime because it's an even number.

Next, compute D such that (DE−1) is evenly divisible by (P−1)(Q−1). Mathematicians write this as DE=1 (mod (P−1)(Q−1)), and they call D the multiplicative inverse of E. This is easy to do—simply find an integer X that causes D=(X (P−1)(Q−1)+1)/E to be an integer, then use that value of D.

The encryption function is encrypt(T)=($T^E$) mod PQ, where T is the plaintext (a positive integer). The message being encrypted, T, must be less than the modulus, PQ.

The decryption function is decrypt(C)=($C^D$) mod PQ, where C is the ciphertext (a positive integer).

The public key is the pair (PQ, E). The private key is the number D. The product PQ is the modulus (often called N in the literature). E is the public exponent. D is the secret exponent.

The public key can be freely published, because there are no known easy methods of calculating D, P, or Q given only (PQ, E) (your public key), if P and Q are each 1024 bits long.

Preferably the authentication process uses encryption keys that are either used only for authentication purposes, or are used for very limited other purposes. The reason for this is to keep the level of exposure of the keys low. The fewer times the keys are used, the harder it will be for the keys to be discovered.

Alternate embodiments could use DH/DSS keys for encryption and digital signatures, or any other acceptable encryption technique. In some embodiments encryption could be eliminated altogether.

Combinations of Security Measures

Preferably an authentication system will use a combination of the security measures listed above: reducing effective transmission ranges; requiring ranging data for authentication; limiting allowable authentication times; and using encryption. The more security checks provided, the greater network security will be with respect to authentication.

However, the required level of security should be balanced against the cost of providing that security. Different embodiments of the present invention can use different combinations of these security measures to obtain the desired level of security.

Authentication Using Reduced Transmission Power

An example of an authentication system and method that uses reduced transmit power to achieve a secure transmission of authentication data is described below with respect to FIGS. 7A–7C.

Figure 7B:
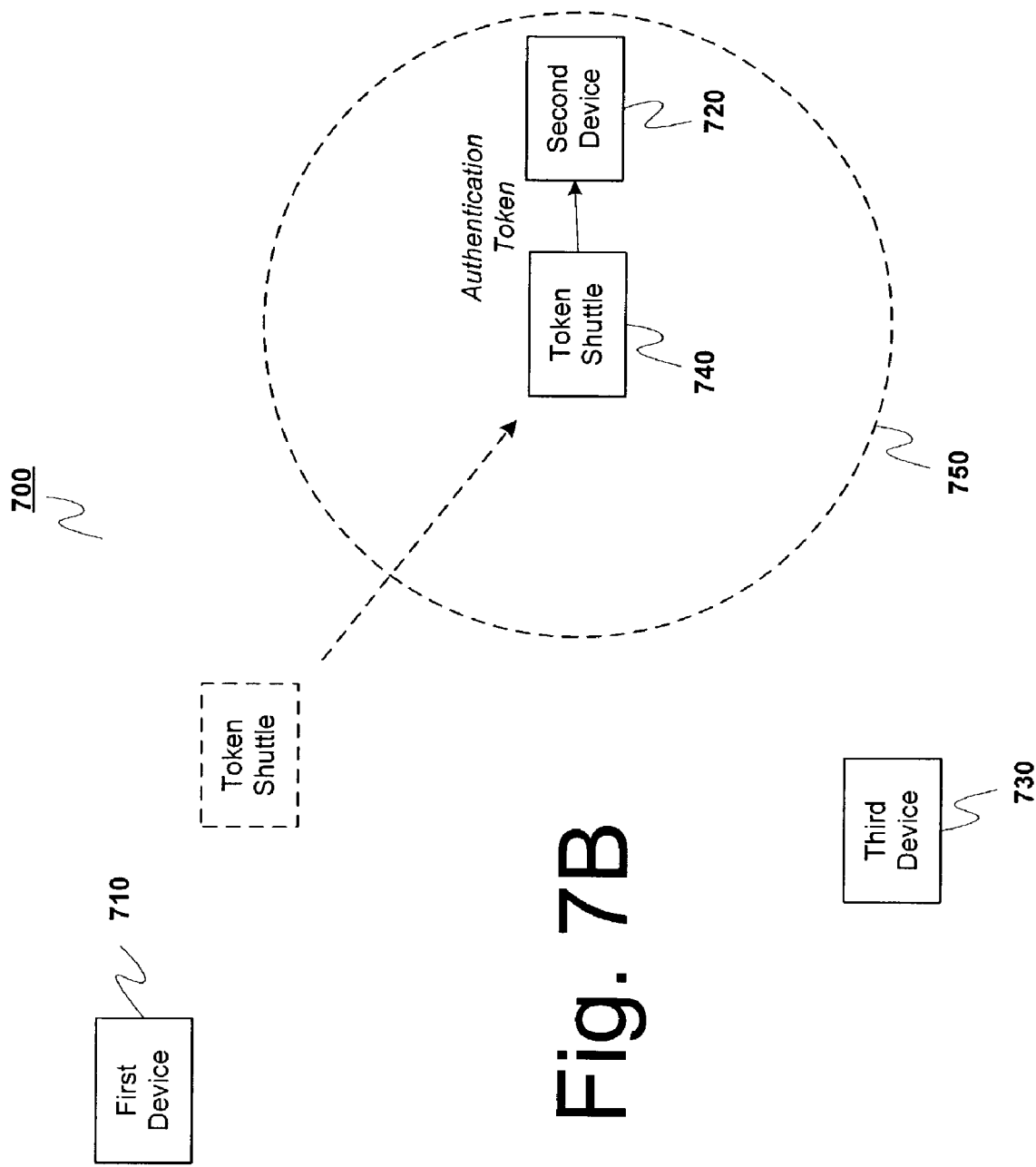

FIGS. 7A–7C are diagrams showing the operation of a token shuttle for authentication according to a preferred embodiment of the present invention. In the embodiment shown in FIGS. 7A–7C, a token shuttle is used as a mobile authentication device for devices in a home WPAN. As shown in FIGS. 7A–7C, the WPAN 700 includes three devices 710, 720, 730 looking to form a network (e.g., a piconet).

Initially, none of the devices 710, 720, 730 can talk to each other. However, a trusted third party has a token shuttle 740 that serves as an authentication device and can be used to pass each device 710, 720, 730 an authentication token. The token shuttle 740 could be, for example, a small battery-powered handheld device with a single button, similar to the sort of device that is used to remotely unlock a car door.

The token shuttle 740 in this embodiment can wirelessly pass an authentication token throughout a limited range of operation 750. Thus, it is necessary for the token shuttle 740 to come to a physical proximity to every device 710, 720, 730 that is to receive a token.

The owner of the network would take the token shuttle 740 and physically approach each of the three devices 710, 720, and 730, as shown in FIGS. 7A–7C. When a given device 710, 720, 730 fell within the range of operation 750 of the token shuttle 740, the authenticator would initiate an authentication process, ultimately resulting in the token shuttle 740 passing an authentication token to the respective device 710, 720, 730.

FIG. 7A shows the token shuttle 740 passing a token to the first device 710. As shown in FIG. 7A, the token shuttle is moved to a location such that the first device 710 is within the range of operation 750 of the token shuttle 740. Since the first device 710 is the only device within the range of operation 750, it is the only device that can be authenticated during the authentication process. Once in position, the token shuttle 740 proceeds with the authentication process of the first device 710, ultimately passing an authentication token to the first device 710.

FIG. 7B shows the token shuttle 740 passing a token to the second device 720. As shown in FIG. 7B, the token shuttle is moved to a location such that the second device 720 is within the range of operation 750 of the token shuttle 740. Since the second device 720 is the only device within the range of operation 750, it is the only device that can be authenticated during the authentication process. Once in position, the token shuttle 740 proceeds with the authentication process of the second device 720, ultimately passing an authentication token to the second device 720.

FIG. 7C shows the token shuttle 740 passing a token to the third device 730. As shown in FIG. 7C, the token shuttle is moved to a location such that the third device 730 is within the range of operation 750 of the token shuttle 740. Since the third device 730 is the only device within the range of operation 750, it is the only device that can be authenticated during the authentication process. Once in position, the token shuttle 740 proceeds with the authentication process of the third device 730, ultimately passing an authentication token to the third device 730.

Once each device had received the authentication token, the three devices 710, 720, and 730 could form a network, since information in the authentication token would allow them to authenticate each other. FIG. 8 is a diagram of a network formed by the authentication processes shown in FIGS. 7A–7C.

As shown in FIG. 8, a network 800 is formed of the first, second, and third devices 710, 720, and 730. Each communicates with each other using wireless links 860. Furthermore, one of the devices 710, 720, 730 will take on the function of a network coordinator, as described above with respect to FIG. 3.

Although the embodiment disclosed in FIGS. 7A–7C and 8 involves having a mobile token shuttle 740 that wirelessly passes an authentication token to stationary devices 710, 720, 730, alternate embodiments could use a different sort of token shuttle 740. For example, the token shuttle 740 could be stationary and each device 710, 720, 730 could be brought into proximity to the token shuttle 740. Alternatively, the devices 710, 720, 730, could be required to physically connect to the token shuttle 740, replacing the wireless transmission of the token with a wired transmission, thus eliminating the requirement of a range of operation 750. The function of the token shuttle 740 could even be achieved by having an authenticator walk around to each device 710, 720, 730 and physically enter in an authentication code (the token) to the device.

In implementation, the token shuttle 740 can be any sort of device that can securely pass on an authentication token to the individual devices 710, 720, 730. What is required in this embodiment, though, is for the token shuttle 740 to physically contact each device 710, 720, 730 and enable them by passing on an authentication token.

Authentication Using Multiple Security Measures

An example of an authentication system and method that uses multiple security measures to achieve a secure transmission of authentication data is described below with respect to FIG. 9.

FIG. 9 is a diagram showing the authentication of a new network device according to a preferred embodiment of the present invention. As shown in FIG. 9, authentication takes place between a new wireless network device 910, e.g. an audio speaker, and an authentication device 960. The new network device 910 comprises first, second, and third indicators 920, 930, and 940 and a first authentication enable element 950. The authentication device comprises a second authentication enable element 970

In the case where the new network device 910 is an audio speaker, it may be simply the end of a radio link. In this case it will receive a radio signal that contains audio data, decode amplify, broadcast out of the speaker. Generally there is no human interaction in this process. However, for authentication, a user carrying the authentication device 960, e.g., a token shuttle, will take action to allow authentication of the new network device 910.

The first authentication enable element 950 causes the device 910 to enter a promiscuous mode for a short period of time, e.g., 10 seconds. During this promiscuous mode, the new device 910 will associate with any other device that it hears. Outside of this promiscuous mode, however, the new device 910 will only communicate with secure devices, i.e., devices that are authenticated and have authenticated it. In the preferred embodiment the first authentication enable element 950 is a button. But alternate embodiments can use other types of first authentication enable elements 950, e.g., a switch, a touch pad, etc.

The first through third indicators 920, 930, and 940 show the user the status of the new device 910. If the first indicator 920 is active, the device 910 is unauthenticated and unassociated with any network; it can just sit there, unable to receive data from any other device. If the second indicator 930 is active, the new device 910 is in a promiscuous mode; any authentication device 960 that is close enough can communicate with the new device 910 and proceed with authentication. If the third indicator 940 is active, the new device 910 is authenticated and has received the authentication token needed to join a network.

In the preferred embodiment the first through third indicators 920, 930, and 940 are colored lights. The first indicator 920 is a red light; the second indicator 930 is a yellow light; and the third indicator 940 is a green light. However, this can be varied in alternate embodiments. The indicators 920, 930, 940 could be LCD displays, white lights, etc., and could even be formed in to the same unit. In some embodiments a single status indicator could be provided that indicated the status of the device 910. For example, an LCD display could be provided that displayed a short description of the device's status. In other embodiments the indicators could be eliminated altogether.

The second authentication enable element 970 will cause the authentication device 960 to proceed with an authentication procedure. In this embodiment, the new device 910 will only participate in this authentication procedure if it takes place when the new device 910 is in a promiscuous mode. In the preferred embodiment the second authentication enable element 970 is a button. But alternate embodiments can use other types of second authentication enable elements 970, e.g., a switch, a touch pad, etc.

To authenticate the new device 910, a user would first activate the first authentication enable element 950 on the device 910 to cause it to enter a promiscuous mode, and would then bring the authentication device 960 close enough to the new device 910 so that the new device 910 was within the minimum range of operation of the authentication device 960, e.g., 1 meter. The user would then activate the second authentication enable element 970 on the authentication device 960 while the new device 910 was still in a promiscuous mode, thereby performing an authentication process and sending the authentication token to the new device 910.

The promiscuous mode allows communication prior to authentication. However, the user has physically authenticated the new device 910 by making certain that three conditions are met, namely: (1) that the first authentication enable element 950 on the new device 910 is activated to cause it to enter a promiscuous mode; (2) that the authentication device 960 is moved close enough to the new device 910 such that the new device 910 is within the minimum range of operation of the authentication device 960; and (3) that before the new device 910 exits the promiscuous mode, the second authentication enable element 970 on the authentication device 960 is activated.

As noted above, the authentication data (e.g., an authentication token) that is passed from the authentication device 960 to the new device 910 during authentication is preferably an encryption key set, i.e., the authentication token comprises both encryption public and private keys.

As noted above, using low transmission power for authentication, the token can be exchanged between the authentication device 960 and the new device 910 only when the range between the two is less than a set minimum authentication range. In addition, if range determinations are also used for authentication, both the authentication device 960 and the new network device 910 will measure the range between them and both must both agree that the other unit is at a proper distance.

Consider the following example. When the authentication device 960 is activated, two nearby devices are in a promiscuous mode: a first new device that is one meter away from the authentication device 960, and a second new device that is five meters away from the authentication device 960. If the authentication range limit is two meters, the authentication device 960 will tell the second new device that at five meters away, it is too far and will not give it an authentication token.

This is all based upon concept of physical security. Only devices that the user has physically authenticated will get within the authentication range. When authenticating devices as described above, the owner of the devices serves as a trusted third party who authenticates the new device. He can physically get close to each device in the network and determine that no unauthorized devices are nearby.

Although in the above example the new device 910 enters a promiscuous mode for a short time and the authentication device 960 must be activated within that time for authentication to take place, the reverse could also be required. In this case, the authentication device 960 could have an authentication enable element that allowed it to temporarily enter a promiscuous mode during which it would authenticate any devices within range. In this case, the new device 910 would have an authentication element that would have to be activated while the authentication device 960 was still in the promiscuous mode.

In addition, while the embodiment above shows the status indicators 920, 930, and 940 associated with the new device, some indicators could be associated with the authentication device. For example, if the authentication device 960 entered a promiscuous mode, it could have an indicator associated with it that displayed this fact. Alternatively, the new device 910 could have an indicator that displayed when the authentication device 960 was in a promiscuous mode. In different embodiments the authentication device 960 and the new device 910 can have whatever indicators are deemed necessary to alert the network user of various device statuses.

Alternate Embodiments for Authentication Device and New Network Device

Figure 10:
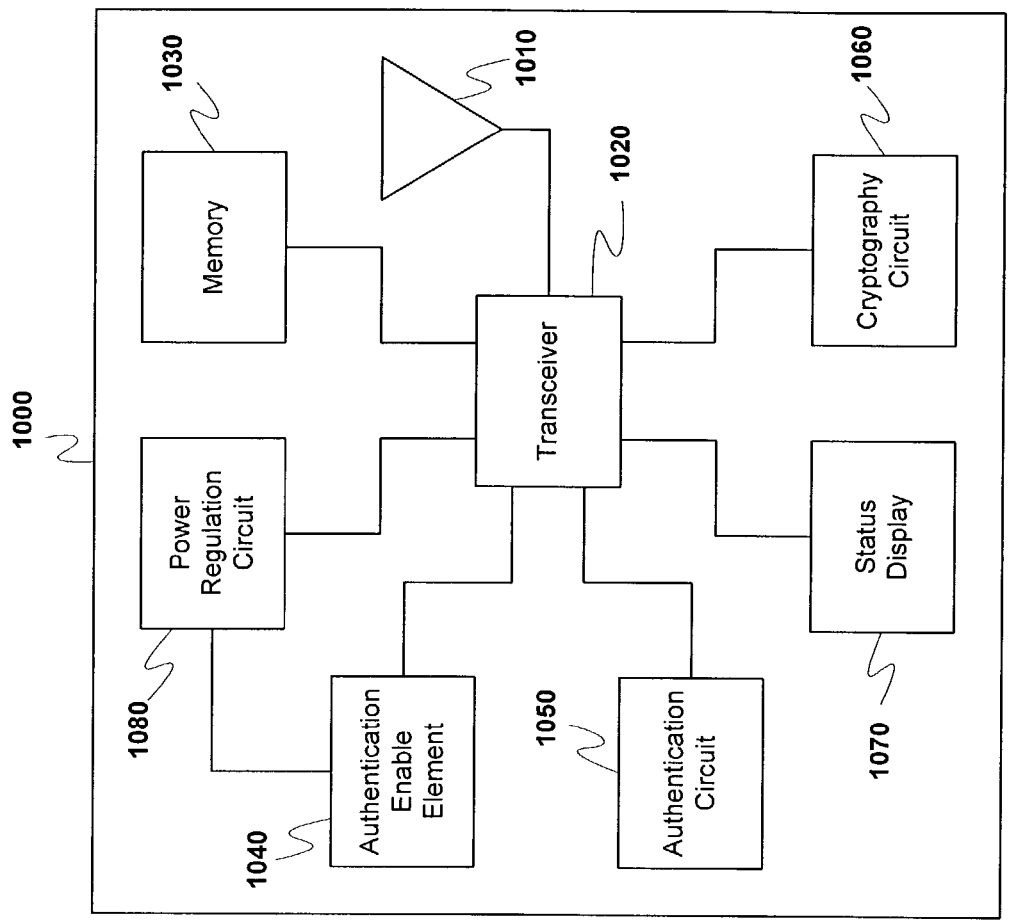
FIG. 10 shows an alternate embodiment of an authentication device according to a preferred embodiment of the present invention.

FIG. 10 shows an alternate embodiment of an authentication device according to a preferred embodiment of the present invention: FIG. 11 shows an alternate embodiment of a new network device according to a preferred embodiment of the present invention.

As shown in FIG. 10, the authentication device 1000 comprises an antenna 1010, a transceiver 1020, a memory 1030, an authentication enable element 1040, and an authentication circuit 1050. The authentication device 1000 may also include a cryptography circuit 1060, a status display 1070 and a power regulation circuit 1080.

The antenna 1010 and the transceiver 1020 serve to wirelessly communicate data between the authentication device 1000 and other devices. This is done using any known wireless data transmission scheme, and so will not be described in detail.

The memory 1030 contains authentication data that can be used by a device to verify its membership in a given network.

The authentication enable element 1040 allows the user to cause the authentication device 1000 to enter an authentication mode. While in the authentication mode, the authentication device 1000 will take action to authenticate new devices. In this preferred embodiment the authentication device 1000 will have its transceiver 1020 actively attempt to open communication with any device that is seeking authentication. However in alternate embodiments entering the authentication mode could cause the transceiver 1020 to listen for a limited time for a device actively requesting authentication.

Regardless, the authentication mode will only last for a limited period of time, whether it's a short time attempting to communicate with other devices or a short time listening for other devices. This enhances security by limiting the time when authentication is possible, allowing a user to focus resources on policing the network during that time.

In this preferred embodiment the authentication enable element 1040 is a button. But alternate embodiments can use other types of authentication enable elements 1040, e.g., a switch, a touch pad, etc.

The authentication circuit 1050 includes the elements necessary to perform the required signal and data analysis required for authentication. This could include comparing two range estimates to see if they differ by more than a set amount, determining whether a range estimate is greater than a threshold value, etc. The authentication circuit 1050 can be a general-purpose microprocessor or a circuit specifically designed to perform the necessary signal and data analysis.

The cryptography circuit 1060 provides any necessary encryption functions for the authentication device 1000, encrypting or decrypting signals sent by or received at the transceiver 1020. In some embodiments the cryptography circuit 1060 will also be able to generate temporary public/private key pairs. The cryptography circuit 1060 can be a general-purpose microprocessor or a circuit specifically designed to perform the necessary cryptographic functions.

The status display 1070 will display the status of the authentication device 1000 to the user. This could include what power transmission mode the authentication device 1000 is in, whether authentication device 1000 is in the authentication mode, or whether there has been a security breach in authentication. In the preferred embodiment the status display 1070 is one or more lights. However, this may be varied in alternate embodiments. For example, an LCD display could be provided that displayed a short description of the device's status. In other embodiments the indicators could be eliminated altogether.

The power regulation circuit 1080 regulates the transmission power of the transceiver 1020 in response to a command from the authentication enable element 1040. If the authentication device 1000 enters into a low power transmission mode during the authentication mode, then the power regulation circuit 1080 will control the lowering of the transmission power of the transceiver 1020 when it enters the authentication mode, and the return to normal transmission power levels when the authentication device 1000 exits the authentication mode.

As shown in FIG. 11, the new network device 1100 comprises an antenna 1110, a transceiver 1120, a memory 1130, and an authentication enable element 1140. The new network device 1100 may also include an authentication circuit 1150, a cryptography circuit 1160, a status display 1170 and a power regulation circuit 1180.

The antenna 1110 and the transceiver 1120 serve to wirelessly communicate data between the new network device 1100 and other devices. This is done using any known wireless data transmission scheme, and so will not be described in detail.

The memory 1130 is where the new network device 1100 will store authentication data that it receives from an authorizing device.

The authentication enable element 1140 allows the user to cause the new network device 1100 to enter an authentication mode. While in the authentication mode, the new network device 1100 will take action to try and be authenticated. In this preferred embodiment the new network device 1100 will listen for a limited time for an authentication device actively seeking devices to be authenticated. However in alternate embodiments entering the authentication mode could cause the transceiver 1120 to actively attempt to open communication with any authentication device that is seeking to authenticate devices.

Regardless, the authentication mode will only last for a limited period of time, whether it's a short time attempting to communicate with an authorization device or a short time listening for an authorization device. This enhances security by limiting the time when authentication is possible, allowing a user to focus resources on policing the network during that time.

In this preferred embodiment the authentication enable element 1140 is a button. But alternate embodiments can use other types of authentication enable elements 1140, e.g., a switch, a touch pad, etc.

The authentication circuit 1150 includes the elements necessary to perform any necessary signal and data analysis required for authentication. This could include comparing two range estimates to see if they differ by more than a set amount, determining whether a range estimate is greater than a threshold value, etc.

An authentication circuit 1150 is not needed in the new network device 1100 if no authentication functions are performed there. However, it can be included if the new network device 1100 needs to perform authentication functions to authenticate an authentication device.

The authentication circuit 1150 can be a general-purpose microprocessor or a circuit specifically designed to perform the necessary signal and data analysis.

The cryptography circuit 1160 provides any necessary encryption functions for the new network device 1100, encrypting or decrypting signals sent by or received at the transceiver 1120. In some embodiments the cryptography circuit 1160 will also be able to generate temporary public/private key pairs. The cryptography circuit 1160 can be a general-purpose microprocessor or a circuit specifically designed to perform the necessary cryptographic functions.

The status display 1170 will display the status of the new network device 1100 to the user. This could include what power transmission mode the new network device 1100 is in, whether the new network device 1100 is in the authentication mode, or whether there has been a security breach in authentication. In the preferred embodiment the status display 1170 is one or more lights. However, this may be varied in alternate embodiments. For example, an LCD display could be provided that displayed a short description of the device's status. In other embodiments the indicators could be eliminated altogether.

The power regulation circuit 1180 regulates the transmission power of the transceiver 1120 in response to a command from the authentication enable element 1140. If the new network device 1100 enters into a low power transmission mode during the authentication mode, then the power regulation circuit 1180 will control the lowering of the transmission power of the transceiver 1120 when it enters the authentication mode, and the return to normal transmission power levels when the new network device 1100 exits the authentication mode.

Authentication Using Encryption

As noted above, the authentication data passed by the authentication device 960 may be an authentication token including a public/private key set. If so, this public/private key set is preferably common to the network. Effectively these serve as the public/private key set for the network coordinator (e.g., the piconet coordinator). One reason for this is that in some networks any device can become the network coordinator. Thus, it is necessary for all devices to have the public/private key pair for the network coordinator.

The network coordinator will need the private key, while the other devices will only need the public key. Which key a device uses thus depends upon what its function is in the network, i.e., coordinator or normal device.

The authentication data, i.e., the authentication token is secret information. If it gets out of the control of the network operator, e.g., if he loses lose the authentication device, it would be necessary to obtain a new authentication device and re-key everything in the network. This would be just like losing your house key. In that case if you wanted to make certain no one could get into your house, you'd have to get your locks changed.

Assuming that authentication proceeds, i.e., one device activates an authentication element while the other is in a promiscuous mode, the two devices will have to start communicating with each other. In the preferred embodiment they will use an encryption algorithm to encrypt the packet exchange for the duration of the token exchange associated with this process.

At the start, both sides do not have any means of encrypting messages that the other can decrypt. The authentication device 960 has the authentication data, i.e., the authentication token, but the new device 910 has not received it yet. Therefore, both the authentication device 960 and the new device 910 generate temporary public/private key pairs, and pass the public keys on to the other device. However, they keep their private keys secret. This allows them to talk to each other in a secure manner just like two people would who were using public/private key pair encryption.

The Authentication Process

Once the authentication device 960 and the new network device 910 have exchanged temporary public keys, they can proceed with the authentication process. A preferred embodiment of this process is described below.

During authentication, the authentication device 960 and the new network device 910 compare range information using transmissions encrypted using the public keys they have received from the other device. The authentication device 960 measures the range to the new device 910 and the device measures the range to the shuttle. Both devices exchange this information and then evaluate the two measurements for two criteria: (1) they must not differ from each other by more than a set tolerance; and (2) they must both be within a set minimum authentication range d. If either criterion is not met, the open exchange is terminated and authentication ends.

For example, suppose our tolerance is 0.1 meter. If the authentication device 960 determines that it is 0.9 meters from the new device 910, and the new device 910 determines that it is 0.7 meters away from the authentication device 960, the authentication will terminate because the range measurements are off from each other by more than 01. meter.

In alternate embodiments it is possible for only one device to make the comparison, e.g., the authentication device 960. How comparisons are made will depend upon which devices the system wishes to check up on. In some embodiments it may not be necessary to monitor devices that are already authenticated, such as the authentication device 960. In such a case, it would not be necessary for the new device 910 to perform a range comparison.

Next the authentication device 960 encrypts the authentication data via an encryption algorithm using the new device's temporary public key and passes it to the new device 910. The new device 910 decrypts the authentication data (e.g., the network coordinator key pair) using its temporary private key and stores it away for future use when authenticating with the network coordinator.

The two devices then perform a mutual authentication to ensure that the process was done correctly. This is done by each device exchanging range information using the newly passed authentication data, i.e., the network coordinator public key as the encryption key.

As before, the two ranges must meet both criteria of proximity and value at both the new device 910 and the authentication device 960 for authentication to be successful. This is to prevent somebody from trying to intercept the authentication data and spoof the authentication device 960. By having one more range check, it will be more difficult for an unauthorized device to step in, overwhelm the power of the new device 910 and hijack the authentication session. An unauthorized device might be able to intercept the authentication data, but it would have a hard time passing ranging data that would validate it.

Of course if this last range check is unsuccessful it means that the system has given away its authentication information to the wrong person and security is compromised. However, at least the user will be made aware of this, and will have the opportunity to take appropriate action. Preferably if authentication fails at this stage of the process, a security indicator will be activated that will tell the user that the authentication data, e.g., system keys, have compromised, allowing him an opportunity to re-key the system.

FIG. 12 is a data flow diagram showing the passage of data between an authentication device and a new network device according to a preferred embodiment of the present invention.

As shown in FIG. 12, the authentication device 960 begins by sending a first temporary public key to the new network device 910 (Data transmission 1210) and the new network device 910 sends a second temporary public key to the authentication device 960. (Data transmission 1220)

The authentication device 960 then makes a first range estimate X of the range to the new device 910 and sends this first range estimate X to the new device 910, encrypted using the first temporary public key. (Data transmission 1230) The new device 910 makes a second range estimate Y of the range to the authentication device 960 and sends this second range estimate Y to the authentication device 960, encrypted using the second temporary public key. (Data transmission 1240)

If these two range estimates meet the requirements set forth above, the authentication device 960 sends the authentication data, e.g. the network coordinator public/private key pair, to the new device 910, encrypted using the first temporary public key. (Data transmission 1250)

Finally, the authentication device 960 and the new network device 910 may make a second set of range estimates. The authentication device 960 makes a first range estimate X of the range to the new device 910 and sends this first range estimate X to the new device 910, encrypted using the authentication data, e.g., the network coordinator public key. (Data transmission 1260) The new device 910 makes a second range estimate Y of the range to the authentication device 960 and sends this second range estimate Y to the authentication device 960, encrypted using the authentication data, e.g., the network coordinator public key. (Data transmission 1270)

In this way no data during authentication is ever sent in an unencrypted manner, and no private keys are ever exchanged over the open air.

Summary of Protection Method

FIG. 13 is a flow chart showing the operation of the authentication process according to a preferred embodiment of the present invention.

As shown in FIG. 13, the process begins when the user physically enables communications in a secure manner. (Step 1305) This can include (1) activating an authentication enable element to put a new device 910 in a mode to receive the authentication data for a limited time; (2) activating an authentication element within the limited time to instruct an authentication device 960 to start the authentication process; and (3) making certain that the authentication device 960 and the new device 910 are close enough to make this process work.

The authentication device 960 and the new device 910 then exchange temporary public keys, keeping the corresponding private keys secret. (Step 1310)

The authentication device 960 and the new device 910 then perform a determination of mutual distance and send this information to each other using the temporary public keys for encryption. (Step 1315)

Then at least one of the authentication device 960 and the new device 910 determine whether these estimates meet the necessary criteria. (Step 1320). These criteria could include being under a certain authentication distance or being within a set margin of error from each other.

If the distance measurements do meet the necessary criteria, then the authentication device 960 sends the authentication data, e.g., an authentication token, to the new device 910 using the temporary public key received from the new device 910 for encryption. (Step 1325)

If the distance measurements do not meet the necessary criteria, then authentication fails and the authentication process terminates. (Step 1330)

After the authentication data is sent, there may be an additional level of verification performed (though this may be eliminated in alternate embodiments). Once again, the authentication device 960 and the new device 910 perform a determination of mutual distance and send this information to each other. However, this time they encode it using the authentication data, e.g., the network coordinator public key, for encryption. (Step 1335)

Then at least one of the authentication device 960 and the new device 910 determine whether these estimates meet the necessary criteria. (Step 1340). These criteria could include being under a certain authentication distance or being within a set margin of error from each other.

If the distance measurements do meet the necessary criteria, then the authentication process is complete. (Step 1345)

If, however, the distance measurements do not meet the necessary criteria, then a security message is sent to the user indicating that authentication data has been compromised (Step 1350), authentication fails and the authentication process terminates. (Step 1330)

Operation Within a Network

Once a new device 910 has obtained the authentication data, it can then proceed to be authenticated by other devices within a network. In an active network, any device that holds the authentication data can use this data to become a member of the network. In embodiments where the authentication data is the public/private key pair for the network coordinator, any device with the authentication data can also become the network coordinator.

An additional level of security is that the network coordinator need never send its public key over the air. Since every device that has the authentication data has the coordinator's public key, no authenticated device will ever need to receive that data. Any device that does not have the public key necessary to talk to the network coordinator is not an authenticated device, and so should not be allowed in the network. This is different from normal key/pair encryption where the public key can be freely given, and serves to further increase security.

In preferred embodiments, the key pair used by the network coordinator will be used as little as possible. If the system requires encrypted operation, the network coordinator key pair can be used to send new encryption data, e.g., new key pairs that can be used for regular transmission. In fact, new encryption key pairs could be distributed for each device or each device pair, as needed. This way the system need not expose its network coordinator key pair any more often than is necessary.

During network authentication, a new device that wishes to join the network generates a temporarily encryption public key that is sent to the network coordinator. If the new device is a valid device, it should already have the network authentication data, which in this embodiment includes the network coordinator's public key.

The network coordinator then generates a random password, e.g., a random number, and sends it to the new device using the network coordinator private key. The device must decrypt this message (using the network coordinator public key) and send it back to the network coordinator using its temporary private key. In this way both the network coordinator and the new device can pass electronic signatures that validate their identities.

In an alternate embodiment, the new device generates a temporary key pair and gives the network coordinator the new device's temporary public key, using the network coordinator's public key for encryption. The network coordinator deciphers the temporary public key using its network coordinator private key and then sends the password to the new device using the new device's public key. The new device then deciphers the password using its private key and encodes the password using the network coordinator's public key and returns it to the network coordinator.

Active Attack Scenario

Stealing authentication information using an active attack would be difficult because to do so would require very sophisticated equipment. An analysis of a possible active attack scenario is provided below.

To successfully fool an authentication device, an imposter would first need to either be close enough to the authentication device to hear the low power signal, or have a high-gain antennae. Since the network user can easily police the limited authentication range, most imposters would have to use a high-gain antenna, an expensive and complicated device.

Furthermore, the imposter would have to know exactly when the network user was going to perform the authentication process. Because either the authentication device or the new device will have a limited authentication duration, the imposter would have to know when this authentication period began in order to perform his infiltration at a time when authentication was possible. Essentially that would mean that the imposter would have to know when the user was going to activate the relevant authentication enable element. This would likely require some sort of surveillance equipment or advance knowledge of authentication.

Furthermore, the imposter would have to trick the authentication device into believing that it was within the limited authentication range. This would involve manipulating a timed exchange or a set exchange of packets in a way that would be extremely complicated to do.

In addition, the imposter would also have to make certain that it could fake a distance from the authentication device that it would be able to match in its own distance estimate, since the authentication device will compare the two range estimates. If the imposter can trick the authentication device into thinking that its within the authentication range, that's only half the battle. It also has to know exactly what range the authentication device will think the imposter is at. This is also very difficult to accomplish. The imposter could try and intercept the range data sent by the authentication device, but since that data is encrypted, the imposter would need to decrypt if before he could use it.

Finally, since the authentication data is never sent unencrypted, in order to steal the authentication data the imposter would have to break a key pair encrypted code, e.g., an RSA code. This too is extremely difficult to do. Furthermore, the entire encryption scheme is premised on the fact that no one will be able to break your key pair encryption.

Furthermore, even if the imposter were able to decrypt an RSA or similar code, he would have to do so in real time to follow the authentication process.

Passive Attack Scenario

Stealing authentication information using a passive attack would also be difficult and would require very sophisticated equipment.

For a passive attack, the imposter would also need to either get within the minimum authentication range or have a high-gain antennae that could pick up the low power authentication transmissions. Likewise, the imposter would have to know exactly when to listen, since the authentication process an only begin within a very small time window set by the network user.

Finally, as with the active attack, the imposter would have to break a key pair encryption code, e.g., RSA, to obtain the authentication information. This is an extremely unlikely event.

Obviously, numerous modifications and variations of the present invention are possible in light of the above teachings. For example, though described in the context of a wireless network, the methods of this disclosure would be applicable to a wired network. It is therefore to be understood that within the scope of the appended claims, the invention may be practiced otherwise than as specifically described herein.

We claim:

1. A method for an authentication device to authenticate a new device in an ultrawide bandwidth (UWB) wireless network, comprising:
   reducing a transmission power of the authentication device to an authentication transmission power level, where an authentication transmission range associated with the authentication power level is lower than a normal transmission range associated with a normal transmission power level used for normal operation in the UWB wireless network;
   determining a first distance measurement at the authentication device using ultrawide bandwidth ranging, the first distance measurement providing a measurement of the distance between the new device and an authentication device, as made by the authentication device;
   evaluating the first distance measurement to determine if it meets authentication criteria; and
   sending authentication data to the new device only if the first distance measurement meets the authentication criteria.

2. A method for an authentication device to authenticate a new device in an ultrawide bandwidth wireless network, as recited in claim 1, wherein the authentication criteria include that the first distance measurement is below a set maximum value.

3. A method for an authentication device to authenticate a new device in an ultrawide bandwidth wireless network, as recited in claim 1, wherein the authentication transmission power level provides the UWB wireless network with an effective range between 0.3 and 2 meters.

4. A method for an authentication device to authenticate a new device in an ultrawide bandwidth wireless network, as recited in claim 3, wherein the normal transmission power level provides the UWB wireless network with an effective range between 5 and 25 meters.

5. A method for an authentication device to authenticate a new device in an ultrawide bandwidth wireless network, as recited in claim 3, wherein the authentication transmission power level provides the UWB wireless network with an effective range between 0.5 and 1 meter.

6. A method for an authentication device to authenticate a new device in an ultrawide wireless network, as recited in claim 3, wherein the authentication transmission power level is between 15 and 25 dB below the normal transmission power level.

7. A method for an authentication device to authenticate a new device in an ultrawide wireless network, as recited in claim 1, further comprising
   receiving a second distance measurement from the new device, the second distance measurement providing a measurement of the distance between the new device and the authentication device, as made by the new device; and
   evaluating the first and second distance measurements to determine if they meet the authentication criteria,
   wherein the step of sending authentication data to the new device is performed only if the first and second distance measurements meet the authentication criteria.

8. A method for an authentication device to authenticate a new device in an ultrawide wireless network, as recited in claim 7, wherein the authentication criteria include that the first and second distance measurements are both below a set minimum value.

9. A method for an authentication device to authenticate a new device in an ultrawide wireless network, as recited in claim 7, wherein the authentication criteria include that the first and second distance measurements are within a set variance from each other.

10. A method for an authentication device to authenticate a new device in an ultrawide wireless network, as recited in claim 9, wherein the step of evaluating the first and second distance measurements is performed by comparing the first measurement with the second measurement to determine a variance between the first and second measurements.

11. A method for an authentication device to authenticate a new device in an ultrawide wireless network, as recited in claim 10, wherein the comparing is performed by taking the absolute value of the difference between the first and second measurements.

12. A method for an authentication device to authenticate a new device in an ultrawide wireless network, as recited in claim 7, further comprising:

sending a temporary public key of a temporary public/private encryption key pair to the new device prior to the step of receiving the second distance measurement, wherein the first distance measurement is encrypted by the new device using the temporary public key, and is decrypted by the authentication device using a temporary private key of the temporary public/private encryption key pair.

13. A method for an authentication device to authenticate a new device in a wireless network, as recited in claim 7, further comprising:

receiving a third distance measurement from the new device, the third distance measurement providing a measurement of the distance between the new device and the authentication device made by the new device;

determining a fourth distance measurement at the authentication device, the fourth distance measurement providing a measurement of the distance between the new device and the authentication device made by the authentication device;

evaluating the third and fourth distance measurements to determine if they meet the authentication criteria; and indicating a security failure if the third and fourth distance measurements do not meet the authentication criteria.

14. A method for an authentication device to authenticate a new device in an ultrawide wireless network, as recited in claim 13, wherein the authentication data includes an authentication public/private encryption key pair.

15. A method for an authentication device to authenticate a new device in an ultrawide wireless network, as recited in claim 14, wherein the third distance measurement is encrypted by the new device using the an authentication public key of the authentication public/private encryption key pair, and is decrypted by the authentication device using an authentication private key of the authentication public/private encryption key pair.

* * * * *